US012235600B2

(12) United States Patent
Imada et al.

(10) Patent No.: US 12,235,600 B2
(45) Date of Patent: Feb. 25, 2025

(54) REMOVABLE UNIT AND IMAGE FORMING APPARATUS

(71) Applicants: Takahiro Imada, Kanagawa (JP); Yoshikuni Sasaki, Kanagawa (JP); Takuya Seshita, Kanagawa (JP)

(72) Inventors: Takahiro Imada, Kanagawa (JP); Yoshikuni Sasaki, Kanagawa (JP); Takuya Seshita, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/379,675

(22) Filed: Oct. 13, 2023

(65) Prior Publication Data

US 2024/0168421 A1 May 23, 2024

(30) Foreign Application Priority Data

Nov. 21, 2022 (JP) ................................ 2022-185970

(51) Int. Cl.
*G03G 15/20* (2006.01)
*G03G 21/00* (2006.01)
*G03G 21/16* (2006.01)

(52) U.S. Cl.
CPC ..... *G03G 15/2017* (2013.01); *G03G 15/2025* (2013.01); *G03G 21/1685* (2013.01); *G03G 15/2064* (2013.01); *G03G 21/1633* (2013.01); *G03G 21/1638* (2013.01); *G03G 2215/2025* (2013.01); *G03G 2221/1639* (2013.01)

(58) Field of Classification Search
CPC ........... G03G 15/2017; G03G 15/2032; G03G 15/2035; G03G 21/1638; G03G 21/1633; G03G 21/1685; G03G 21/1695; G03G 21/1839; G03G 21/1853; G03G 21/1864;
(Continued)

(56) References Cited

U.S. PATENT DOCUMENTS 5,802,426 A * 9/1998 Miyazaki ........... G03G 15/2064
399/113
10,545,448 B2 * 1/2020 Sugiyama ............ G03G 15/657
(Continued)

FOREIGN PATENT DOCUMENTS

JP 2001109215 A * 4/2001
JP 2003307944 A * 10/2003
(Continued)

*Primary Examiner* — Robert B Beatty
(74) *Attorney, Agent, or Firm* — XSENSUS LLP

(57) ABSTRACT

A removable unit that is attachable to and detachable from a body of an apparatus includes a positioning projection and an upstream projection. The positioning projection projects downward to position a unit or a member located below the removable unit when the removable unit is attached to the body. The upstream projection projects more downward than the positioning projection at an upstream end of the removable unit in an attachment direction of the removable unit to the apparatus. A lower end of the positioning projection is located higher than a line connecting a lower end of the upstream projection and a lower portion of a downstream end of the removable unit in the attachment direction when viewed in a direction orthogonal to both an up and down direction and the attachment direction.

19 Claims, 16 Drawing Sheets

(58) Field of Classification Search
CPC ... G03G 2221/1639; G03G 2221/1642; G03G 2221/1687; G03G 2221/1884
USPC .................................................. 399/122, 124
See application file for complete search history.

(56) References Cited

U.S. PATENT DOCUMENTS

| | | | | |
|---|---|---|---|---|
| 2008/0317532 | A1* | 12/2008 | Ehara | G03G 15/657 399/400 |
| 2009/0123201 | A1* | 5/2009 | Ehara | G03G 15/2064 399/328 |
| 2010/0067952 | A1 | 3/2010 | Fujita et al. | |
| 2011/0044704 | A1* | 2/2011 | Uehara | G03G 21/1633 399/21 |
| 2012/0251157 | A1* | 10/2012 | Tanda | G03G 21/1685 399/122 |
| 2017/0336742 | A1* | 11/2017 | Yamanaka | G03G 15/6573 |
| 2019/0004474 | A1* | 1/2019 | Kamiya | G03G 21/1685 |

FOREIGN PATENT DOCUMENTS

| | | | |
|---|---|---|---|
| JP | 2010-072243 | A | 4/2010 |
| JP | 2012-093651 | A | 5/2012 |
| JP | 2013-083867 | A | 5/2013 |
| JP | 2019-101171 | A | 6/2019 |

* cited by examiner

REMOVABLE UNIT AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-185970, filed on Nov. 21, 2022, in the Japan Patent Office, the entire disclosure of which is hereby incorporated by reference herein.

BACKGROUND

Technical Field

Embodiments of the present disclosure relate to a removable unit and an image forming apparatus.

Related Art

In the related art, a removable unit is known that is attachable to and detachable from an apparatus body. A fixing device as the removable unit described above is known that includes a positioning projection that projects downward and positions a guide of a transfer unit positioned below the fixing device when the fixing device is attached to the apparatus body.

SUMMARY

In an embodiment of the present disclosure, there is provided a removable unit that is attachable to and detachable from a body of an apparatus and includes a positioning projection and an upstream projection. The positioning projection projects downward to position a unit or a member located below the removable unit when the removable unit is attached to the body. The upstream projection projects more downward than the positioning projection at an upstream end of the removable unit in an attachment direction of the removable unit to the apparatus. A lower end of the positioning projection is located higher than a line connecting a lower end of the upstream projection and a lower portion of a downstream end of the removable unit in the attachment direction when viewed in a direction orthogonal to both an up and down direction and the attachment direction.

In another embodiment of the present disclosure, there is provided an image forming apparatus that includes the removable unit.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
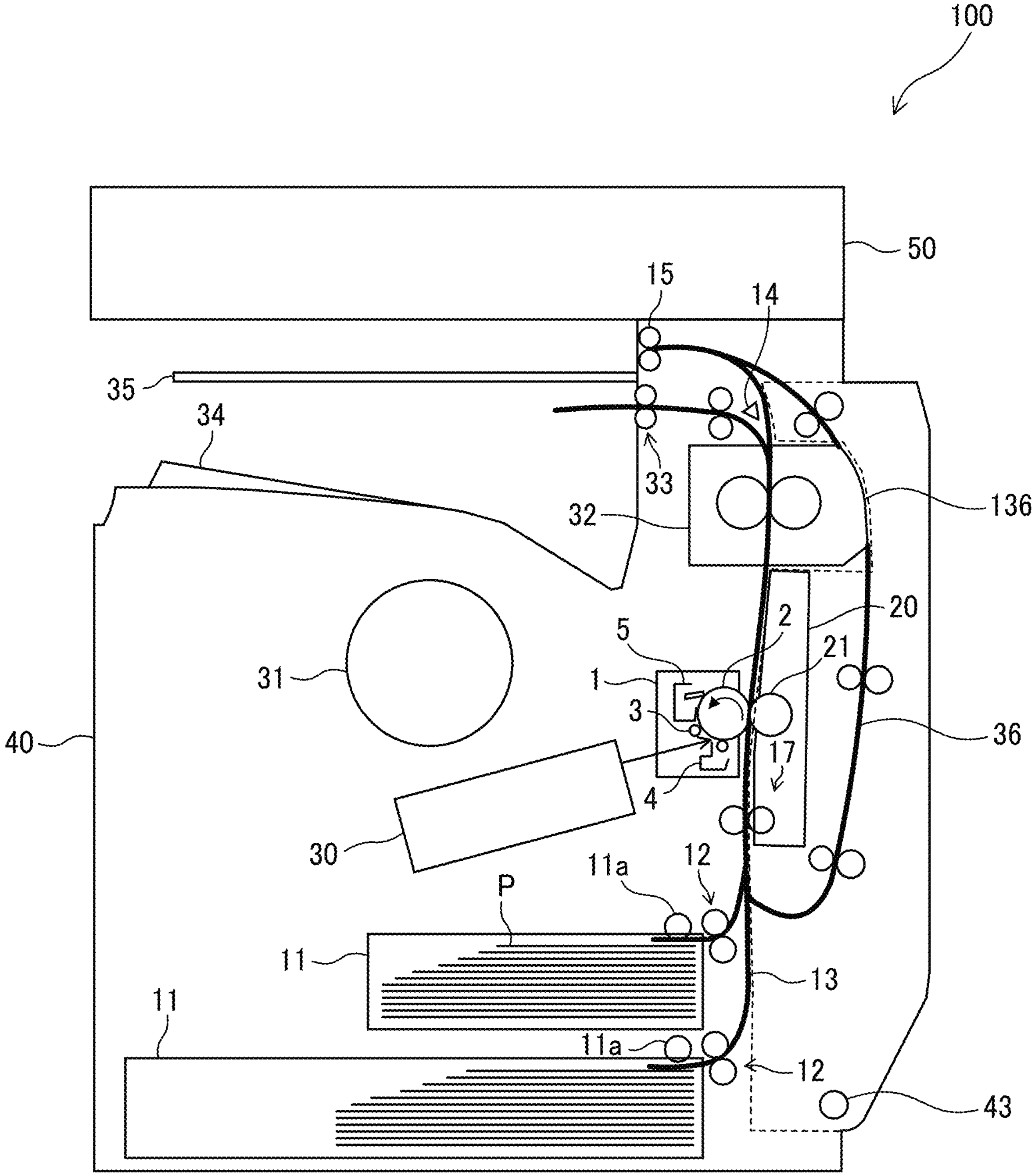
FIG. 1 is a schematic diagram of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of an image forming apparatus that forms an image by an electrophotographic method, as an image forming apparatus according to embodiments of the present disclosure. FIG. 1 is a schematic diagram of an image forming apparatus 100 according to an embodiment of the present disclosure. An image reading device 50 is attached to an upper portion of an apparatus body 40 of the image forming apparatus 100.

A process cartridge 1 is disposed inside the apparatus body 40. The process cartridge 1 includes a photoconductor 2 as a latent image bearer, a charging device 3, a developing device 4, and a cleaning device 5, which are disposed around the photoconductor 2 and serve as process means acting on the photoconductor 2. The process cartridge 1 is detachably attached to the apparatus body 40. The photoconductor 2, the charging device 3, the developing device 4, and the cleaning device 5 are unitized as the process cartridge 1, which facilitates replacement and maintenance work. High positional accuracy among the members can be maintained, and improvement in the image quality to be formed can be achieved.

A transfer device 20 as a transferor includes a transfer roller 21 and one roller of a registration roller pair 17, and the transfer roller 21 is pressed against and contacts the circumferential surface of the photoconductor 2. The fixing device 32 as a removable unit is disposed above the transfer device 20. The apparatus body 40 is provided with a laser writing device 30 as a latent image forming device. The laser writing device 30 includes a laser light source, a rotating multi-faced mirror for scanning, a polygon motor, and an fθ lens. The apparatus body is provided with sheet cassettes 11 in multiple stages for storing sheets P such as transfer sheets and OHP films.

When copying is performed using the apparatus configured as described above, a user pushes a start switch. First, the contents of the document set in the image reading device 50 are read. At the same time, the photoconductor 2 is rotated by a photoconductor drive motor, and the charging device 3 uniformly charges the surface of the photoconductor 2. Subsequently, a writing process is executed using the laser writing device 30 by irradiating laser light according to the document content read by the image reading device 50. As a result, an electrostatic latent image is formed on the surface of the photoconductor 2, and then the developing device 4 applies toner to an electrostatic latent image on the surface of the photoconductor 2 to visualize (develop) the electrostatic latent image.

When a user presses a start switch, a sheet P selected from the multi-stage sheet cassette 11 is fed by a pickup roller 11*a*. Subsequently, the sheet P is separated one by one by a separation section 12 and conveyed to a supply passage 13. The sheet P conveyed to the supply passage 13 contacts the registration roller pair 17 and is stopped. The transfer roller 21 contacts the photoconductor 2 to convey the sheet P to a transfer nip in synchronization with the rotation timing of the toner image visualized on the photoconductor 2.

The toner image on the photoconductor 10 is transferred onto the sheet P conveyed to the transfer nip by the transfer roller 21. The cleaning device 5 removes and cleans the residual toner on the photoconductor 2 after transfer of the image. Then, an electric-discharging device removes the residual potential on the photoconductor 2 from which the residual toner has been removed. The image forming apparatus 100 then prepares for the image formation that the charging device 3 starts. The residual toner removed by the cleaning device 5 is conveyed to a waste tray.

On the other hand, the sheet P on which the image has been transferred is guided to the fixing device 32 and is applied with heat and pressure to fix the toner image. In single-sided image formation in which an image is formed on only one side of the sheet P, the sheet P on which the image has been fixed is guided to a sheet ejection roller pair 33 by a branching claw 14. The sheets P are ejected and stacked on a sheet ejection stacking section 34 by the sheet ejection roller pair 33.

In double-sided image formation, the sheet P on which an image has been fixed is guided to a reversing roller 15 by the branching claw 14 and is conveyed to a reversing tray 35 disposed on the sheet ejection stacking section 34 by the reversing roller 15. Before a trailing end of the sheet P in a conveyance direction passes through the reversing roller 15, the reversing roller 15 is rotated in reverse, and the sheet P is conveyed in a switchback manner to a re-supply passage 36 as a reverse conveyance passage. The sheet P conveyed to the re-supply passage 36 is conveyed to the registration roller pair 17 by a plurality of conveying rollers disposed in the re-supply passage 36. In the same manner as described above, the sheet P is fed to the transfer nip, a toner image is transferred to a back surface that is a second surface of the sheet P. and then the sheet P passes through the fixing device 32 and is ejected onto the sheet ejection stacking section 34.

In the present embodiment, a guide portion 136 that guides the sheet P in the re-supply passage 36 is disposed in a cover of the fixing device 32. As a result, the re-supply passage 36 can be arranged close to the fixing device 32, and then the size of the image forming apparatus can be reduced.

Figure 2:
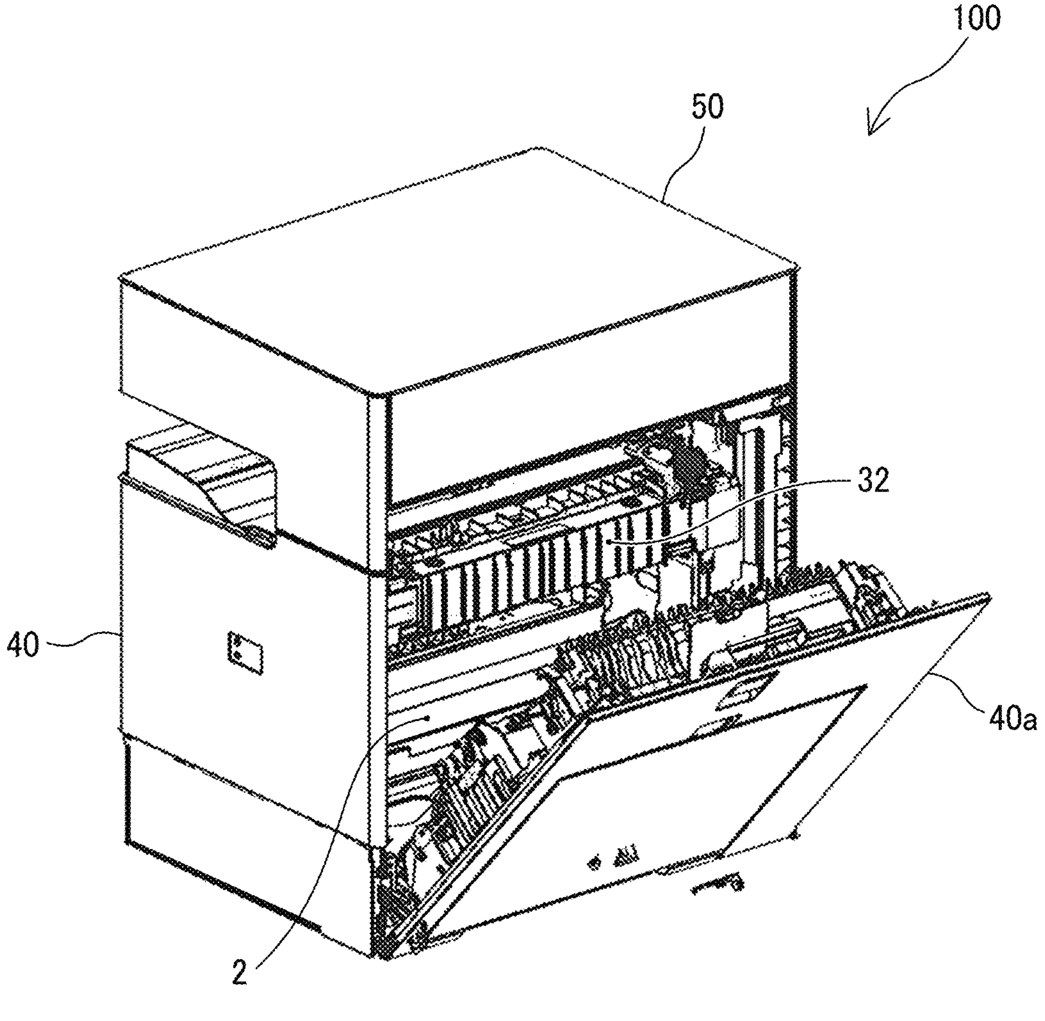
FIG. 2 is a perspective view of an image forming apparatus illustrating a state where a side cover of an apparatus body is opened, according to an embodiment of the present disclosure.
Figure 3:
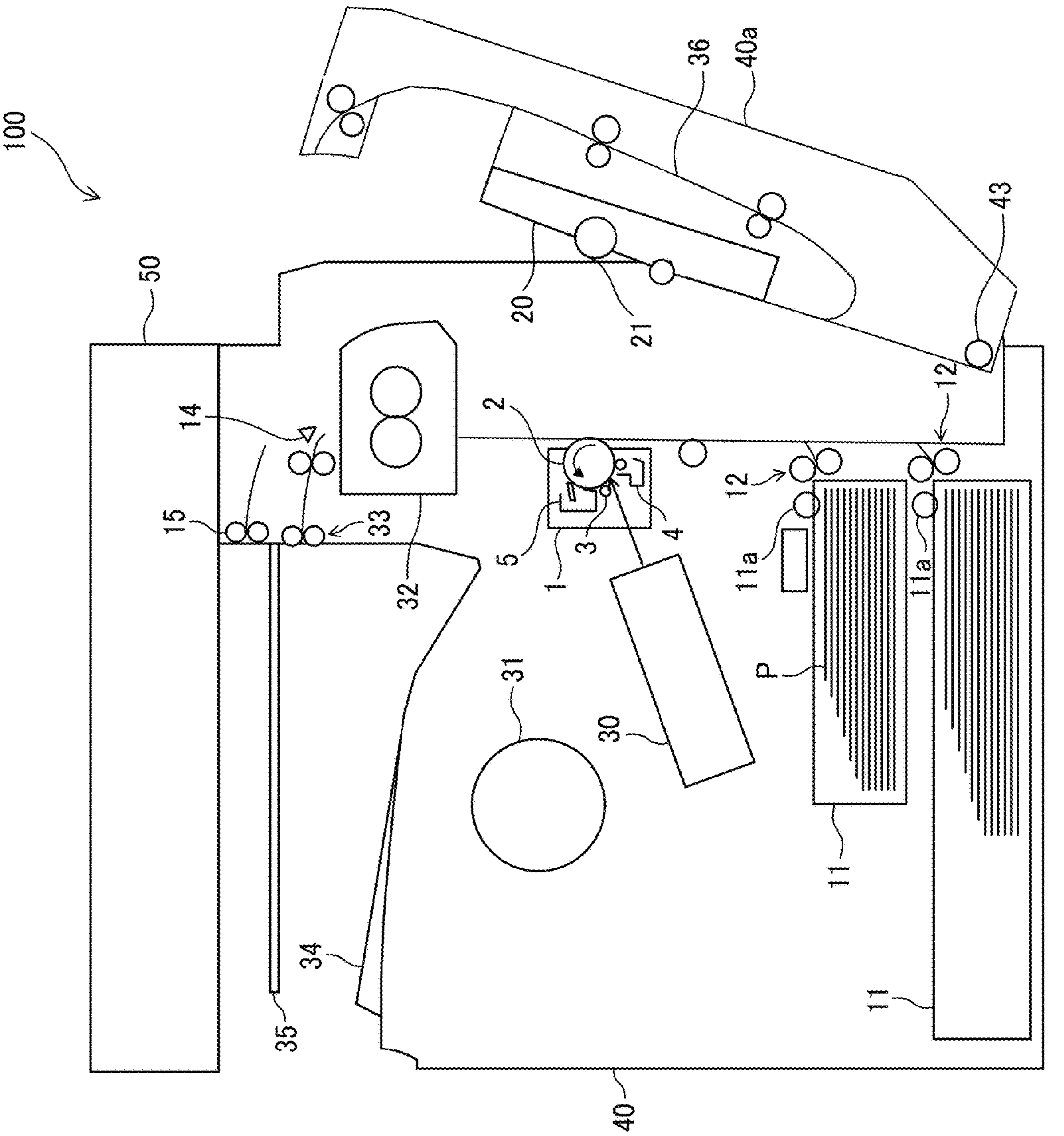
FIG. 3 is a schematic diagram of the image forming apparatus illustrating a state where the side cover of the apparatus body is opened, according to an embodiment of the present disclosure.

FIG. 2 is a perspective view of the image forming apparatus 100 where a side cover 40*a* of an apparatus body is opened, according to the present embodiment. FIG. 3 is a schematic diagram of the image forming apparatus 100 where the side cover 40*a* of the apparatus body is opened, according to the present embodiment. On the right side face of the apparatus body 40 in FIG. 1, the side cover 40*a* as an opening and closing member that includes the re-supply passage 36 and holds the transfer device 20 is disposed. As illustrated in FIGS. 2 and 3, the side cover 40*a* is disposed to be rotatable around a rotation shaft 43 as a fulcrum arranged at a lower portion thereof, and is openable and closable with respect to the apparatus body 40.

As illustrated in FIG. 1, when the side cover 40*a* is closed relative to the apparatus body 40, a conveyance passage from the supply passage 13 to an outlet of the fixing device 32 is formed with the apparatus body 40. On the other hand, when the side cover 40*a* is open as illustrated in FIG. 3, the conveyance passage from the supply passage 13 to an exit of the fixing device 32 is open, and then jammed sheets can be easily removed. As illustrated in FIG. 2, the fixing device 32 is exposed, and can be attached to and detached from the apparatus body 40.

Figure 4:
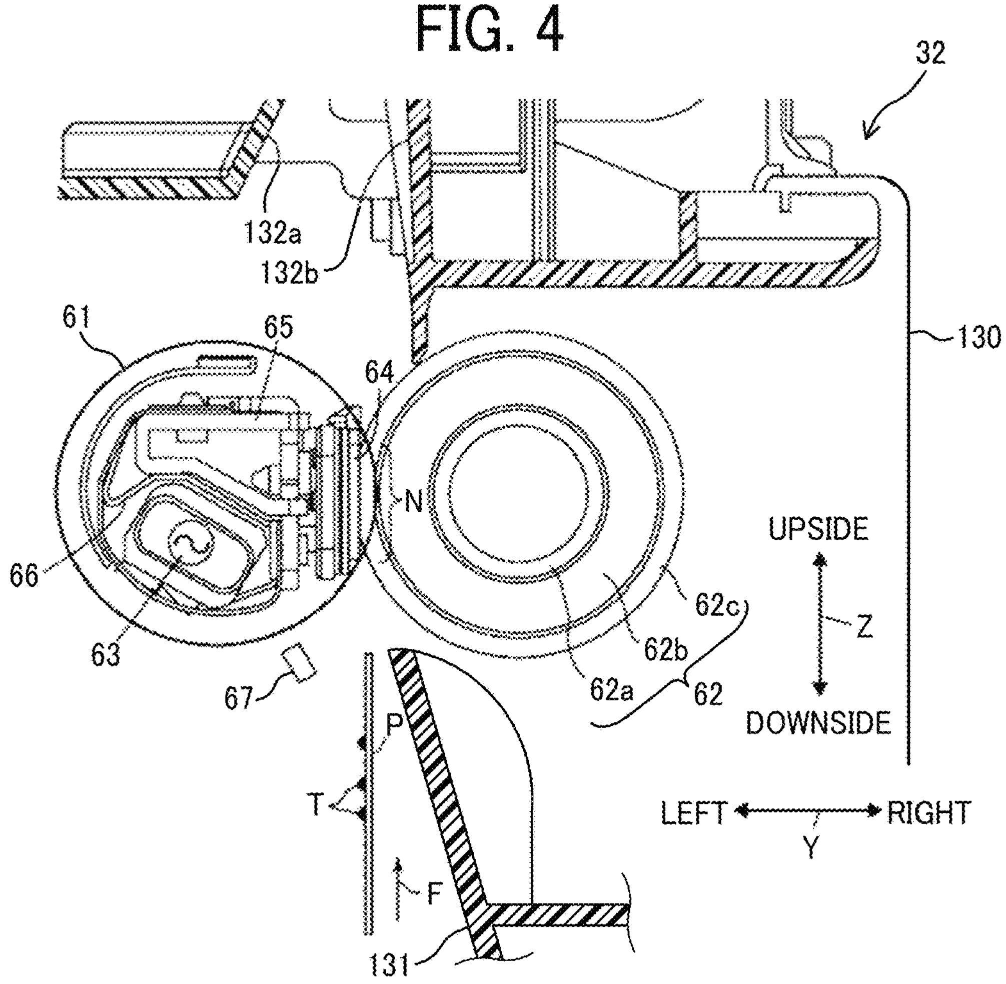
FIG. 4 is a schematic diagram of a fixing device of the image forming apparatus according to an embodiment of the present disclosure.

FIG. 4 is a schematic diagram of the fixing device 32 according to the present embodiment. The fixing device 32 serving as a removable unit is used to fix the transferred toner image T on the sheet P by melting and permeating the toner with heat and pressure, and includes a fixing belt 61 as a flexible endless heating member that can rotate while being heated.

The fixing device 32 further includes a pressing roller 62 as a pressing member that contacts the fixing belt 61 and forms a nip portion N by applying pressure to the fixing belt 61. A heater 63 as a heat source composed of a halogen lamp is disposed that heats a region other than the nip portion N, that is, the region of the fixing belt 61 that circulates on the side opposite the nip portion N in the present embodiment inside the fixing belt 61. A nip-forming member 64 that is a base member, which is disposed on the inner side of the fixing belt 61, for forming a nip, a stay 65 that supports the nip-forming member 64, and a reflecting member 66 that reflects light irradiated from the heater 63 toward the fixing belt 61 are disposed inside the fixing belt 61.

The nip-forming member 64 has a flat-shaped nip portion N, but the shape is not limited thereto. For example, the nip-forming member 64 may be formed in a concave shape along the circumferential surface of the pressing roller 62. The nip-forming member 64 is formed in a concave shape along the circumferential surface of the pressing roller 62 to cause the leading end of the sheet P passing through the nip portion N to be closer to the pressing roller 62, and then separability of the sheet P from the fixing belt 61 can be increased.

Lubricant such as fluorine grease and silicone oil is applied to the inner circumferential surface of the fixing belt 61, and the lubricant is interposed between the nip-forming member 64 and the inner circumferential surface of the fixing belt 61 to reduce sliding torque.

The temperature of the fixing belt 61 is detected by a temperature sensor 67 disposed on the side on which the sheet P enters the nip portion, and is used for feedback processing of the heater 63. In FIG. 4, an arrow F indicates a conveyance direction of the sheet P.

The fixing belt 61 is an endless belt formed in the shape of a thin and flexible sleeve, and is composed of a base material and a release layer located on the surface of the base material. As the base material, a metal material such as nickel or steel use stainless (SUS), or a resin material such as polyimide is used. The release layer is made of, for example, tetrafluoroethylene-perfluoroalkyl vinyl ether copolymer (PFA) or polytetrafluoroethylene (PTFE) having releasability from toner.

The pressing roller 62 includes a core metal 62*a*, an elastic layer 62*b* provided on the core metal 62*a* and made of, for example, foamable silicone rubber, silicone rubber, or fluorine rubber, and a release layer 62*c* provided on the elastic layer 62*b* and made of PFA or PTFE. The pressing roller 62 is pressed toward the fixing belt 61 by a pressing member and abuts against the nip-forming member 64 in contact with the fixing belt 61 therebetween.

An elastic layer 62*b* of the pressing roller 62 is crushed at a portion where the pressing roller 62 and the fixing belt 61 contact each other, so that the nip-forming member 64 receives a pressing force from the fixing belt 61 to form the nip portion N having a predetermined length.

The pressing roller 62 is driven to rotate by a drive source such as a motor included in the apparatus body 40. When the pressing roller 62 rotates, the drive force is transmitted to the fixing belt 61 at the nip portion N, so that the fixing belt 61 is driven to rotate.

In the present embodiment, the pressing roller 62 is a solid roller, but may be a hollow roller. In that case, a heat source such as a halogen heater using radiant heat may be disposed inside the pressing roller 62. Even in a case where the pressing roller 62 is a hollow roller, providing an elastic layer having a thickness of 100 μm or more is desirable. Eliminating the elastic layer can reduce the heat capacity of the pressing roller 62 and the fixability can be increased. However, when unfixed toner is pressed and fixed, micro unevenness on the surface of the belt are transferred to an image and gloss unevenness occurs in a solid portion of the image. For this reason, providing an elastic layer having a thickness of 100 μm or more is desirable.

As a pipe-shaped metal used for the hollow roller, for example, aluminum, iron, or stainless steel can be selected. In a case where a heat source is disposed in the pressing roller 62, in order to prevent a support from being heated by radiation heat from the heat source, providing a heat insulating layer on a surface of the support or providing a heat ray reflecting surface by mirror finishing are preferable. The heat source in this case is not limited to the halogen heater described above, and an induction heating (IH) heater, a resistance heating element, or a carbon heater may also be used.

As illustrated in FIG. 4, the fixing device 32 includes a fixing entrance guide 131 that guides the sheet P on which the toner image T is transferred to the nip portion N, and a pair of fixing exit guides 132*a* and 132*b* that guide the sheet P on which the toner image is fixed at the nip portion. These guides 131, 132*a*, and 132*b* are integrally molded with a fixing cover 130 made of plastic.

For example, the pressing roller 62 and the stay 65 are held by a metal frame 140 (see FIG. 11) made of sheet metal. The metal frame 140 has a higher rigidity than resin. Thus, holding the pressing roller 62 and the stay 65 on the metal frame 140 can increase positional accuracy of components.

Figure 5:
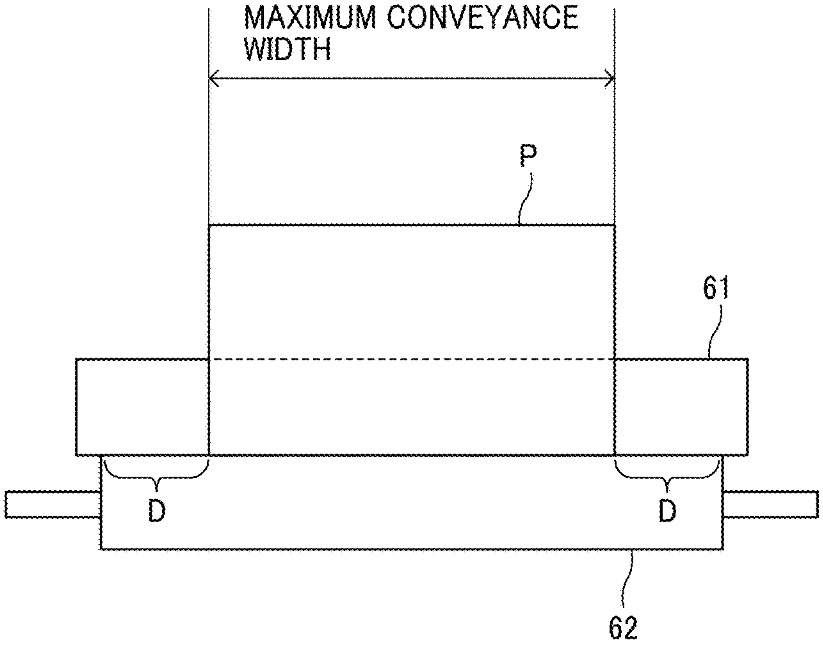
FIG. 5 is a diagram illustrating lengths of a fixing belt and a pressing roller in a sheet width direction, according to an embodiment of the present disclosure.

As described above, in the present embodiment, the rotational drive force of the pressing roller 62 is transmitted to the fixing belt 61 at the nip portion N, so that the fixing belt 61 is driven to rotate. As illustrated in FIG. 5, the pressing roller 62 and the fixing belt 61 are longer by D mm (15 to 20 mm) from ends in the width direction of a sheet having a maximum sheet conveyance width in which the image forming apparatus can convey the sheet P. As a result, even when a sheet having a maximum sheet conveyance width in which the image forming apparatus can convey the sheet P is passed through the nip portion N, the drive force can be transmitted preferably from the pressing roller 62 to the fixing belt 61. Thus, the fixing belt 61 is favorably driven to rotate by the pressing roller 62.

Figure 6:
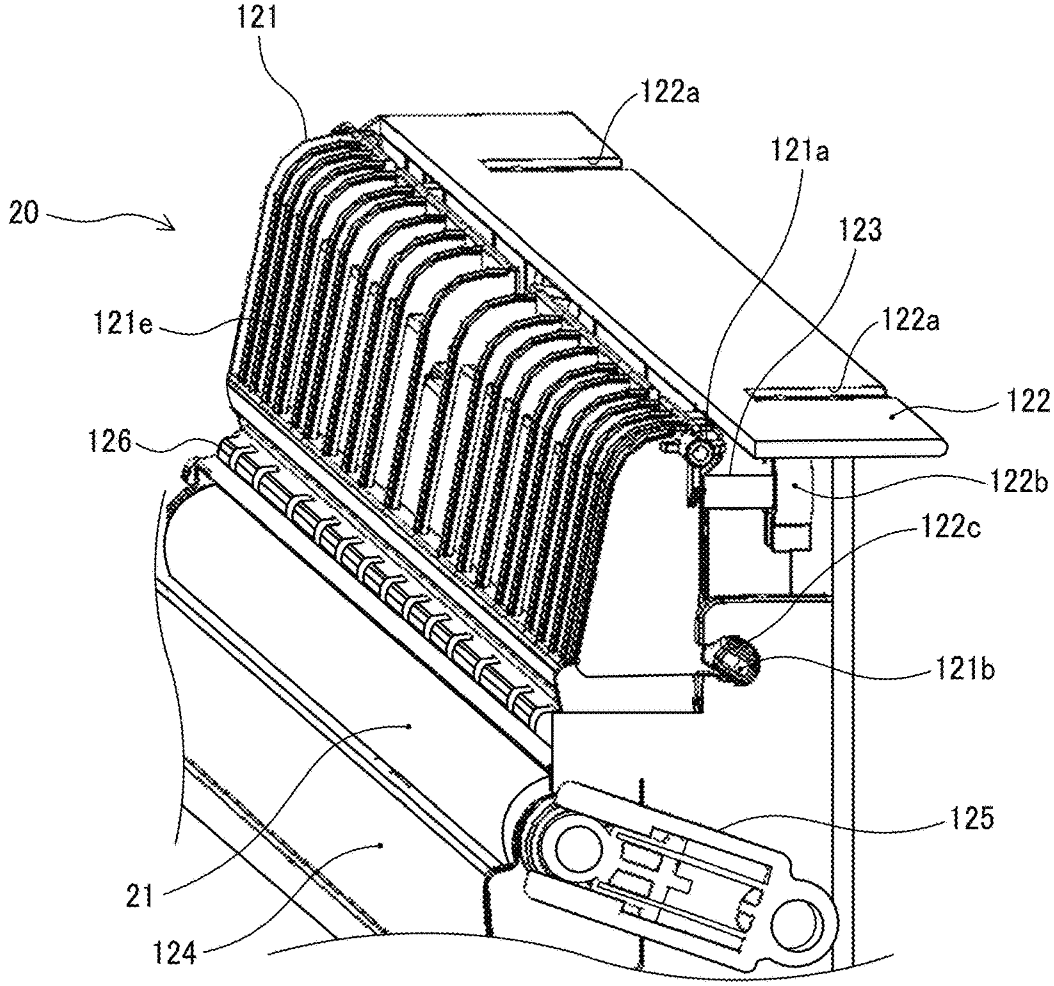
FIG. 6 is a perspective view of an upper portion of a transfer device, according to an embodiment of the present disclosure.
Figure 7:
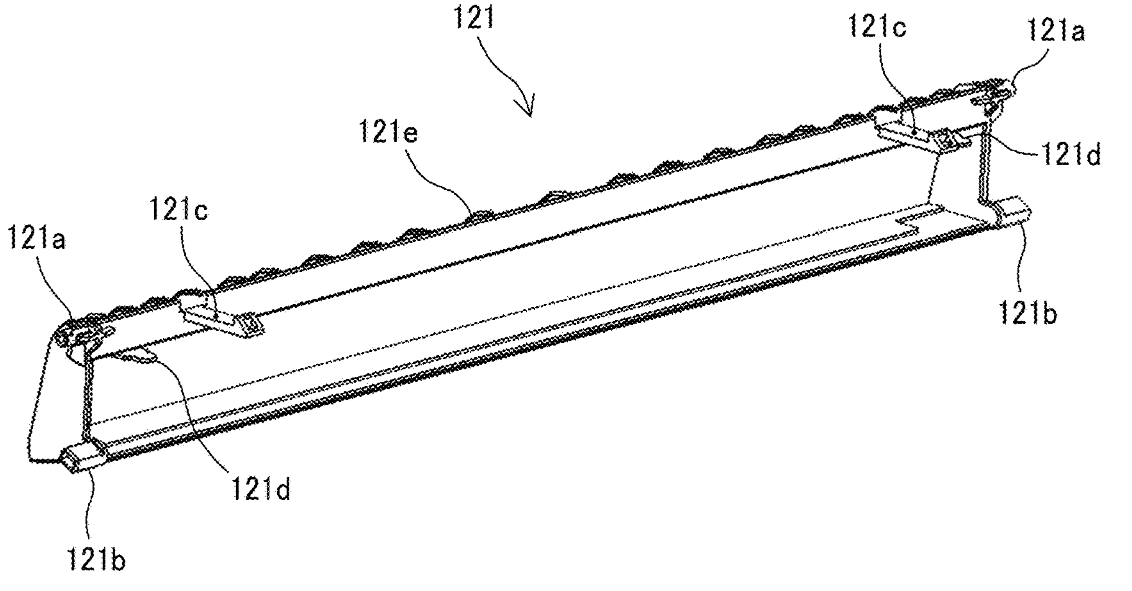
FIG. 7 is a perspective view of a transfer exit guide, according to an embodiment of the present disclosure.

FIG. 6 is a perspective view of an upper portion of the transfer device 20 according to the present embodiment, and FIG. 7 is a perspective view of a transfer exit guide 121 according to the present embodiment. The transfer device 20 illustrated in FIG. 6 includes a transfer entrance guide 124 and the transfer exit guide 121. The transfer entrance guide 124 guides the sheet to the sheet transfer nip. The transfer exit guide 121 guides the sheet on which the toner image is transferred to the fixing device 32. The transfer entrance guide 124 and the transfer exit guide 121 are held by a transfer housing 122. The transfer housing 122 also holds a biasing mechanism 125 that supports the transfer roller 21 and biases the transfer roller 21 toward the photoconductor 2, and one roller of the registration roller pair 17. The transfer housing 122 also holds an electric-discharge portion 126 that electrically discharges a sheet disposed between the transfer roller 21 and the transfer exit guide 121.

As illustrated in FIG. 7, a support shaft 121*b* is disposed between lower portions of both ends of the transfer exit guide 121 in the sheet width direction. In upper portions of both ends of the transfer exit guide in the sheet width direction, positioning bosses 121*a* to be positioned in the fixing device 32 are disposed. On the side of the transfer exit guide 121 opposite a sheet guide portion 121*e*, a pair of hook claws 121*c* for hooking hook holes 122*a* of the transfer housing 122 are disposed. On the side of the transfer exit guide 121 opposite the sheet guide portion 121*e*, a pair of spring attachment portions 121*d* to which one end of a compression spring 123 is attached are disposed. The other end of the compression spring 123 is inserted into a cylindrical spring receiving portion 122*b* of the transfer housing 122.

The support shafts 121*b* of the transfer exit guide 121 are rotatably supported by support grooves 122*c* of the transfer housing 122, and the hook claws 121*c* are hooked to the hook holes 122*a*. As a result, the transfer exit guide 121 is swingably held by the transfer housing 122 with the support shafts 121*b* as fulcrums.

Figure 8:
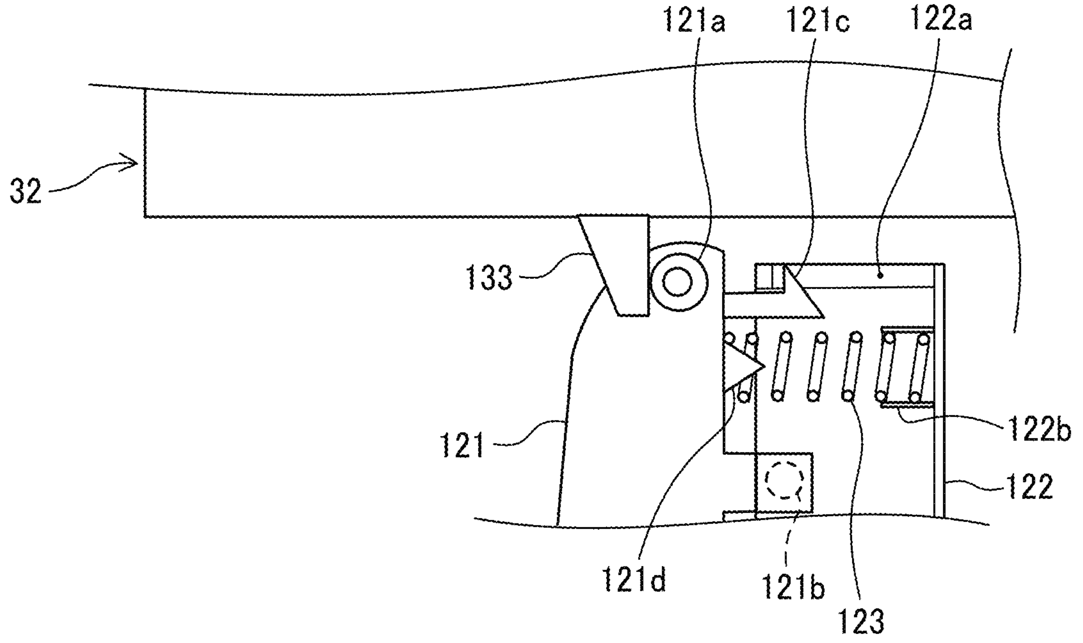
FIG. 8 is a schematic diagram of a transfer exit guide and a fixing device, illustrating how the relative positions of the transfer exit guide and the fixing device are adjusted, according to an embodiment of the present disclosure.

FIG. 8 is a schematic diagram of the transfer exit guide 121 and the fixing device 32, illustrating how the relative positions of the transfer exit guide 121 and the fixing device 32 are adjusted, according to the present embodiment. As illustrated in FIG. 8, the transfer exit guide 121 is biased toward the left side in FIG. 8 by the compression spring 123. The transfer device 20 is held by the side cover 40*a* (see FIGS. 2 and 3) as described above. When the side cover 40*a* is open, the pair of hook claws 121*c* contact against the left end of the hook holes 122*a* in FIG. 8. As a result, when the side cover 40*a* is closed, the transfer exit guide 121 is held by the transfer housing 122 in a thrusting posture such that the positioning boss 121*a* contacts the positioning projection 133 of the fixing device 32 projecting downward.

As the side cover 40*a* is closed, the positioning boss 121*a* contacts the positioning projection 133 of the fixing device 32. When the side cover 40*a* is further closed from this state, the transfer exit guide 121 rotates clockwise in FIG. 8 with the support shafts 121*b* as fulcrums against the biasing force of the compression springs 123. Thus, the transfer exit guide 121 is positioned to the fixing device 32.

Figure 9:
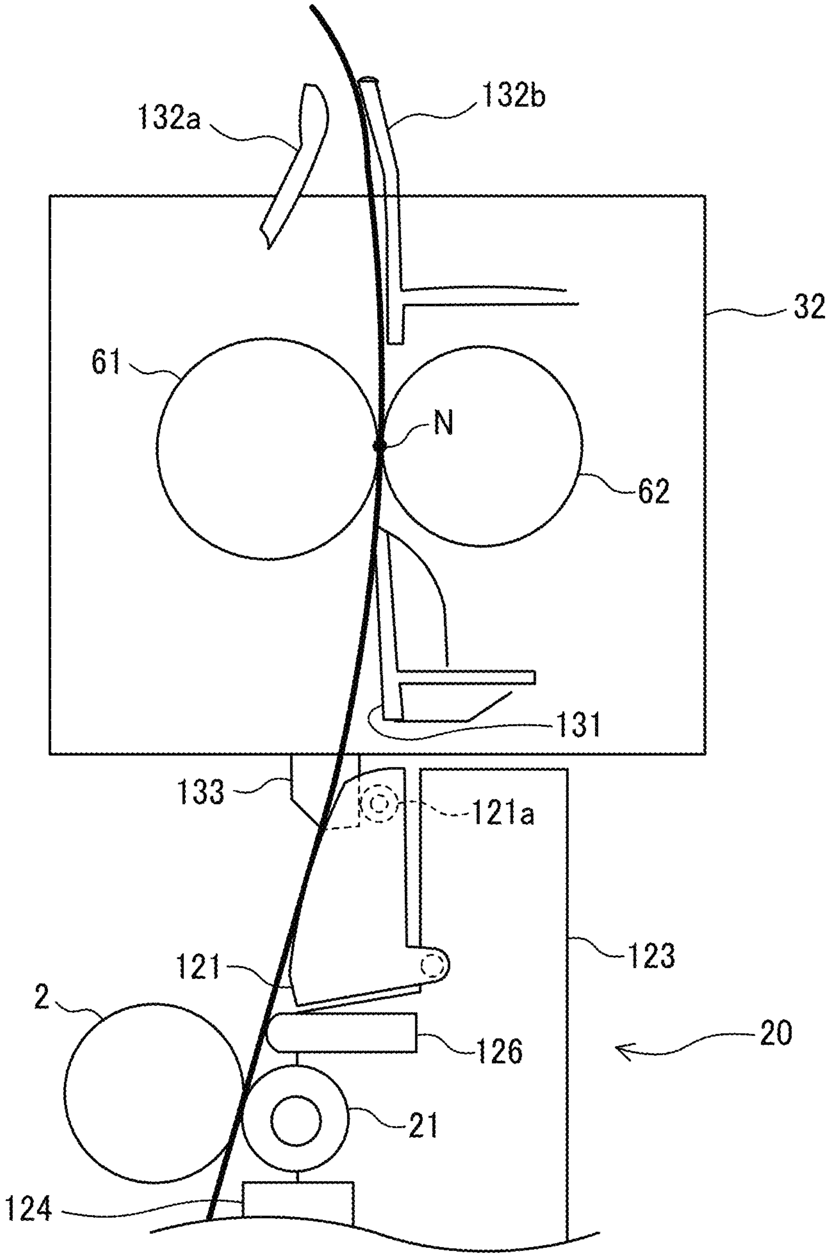
FIG. 9 is a diagram illustrating an advantage obtained by accurately positioning the transfer exit guide in the fixing device, according to an embodiment of the present disclosure.

The positioning projection 133 of the fixing device 32 is integrally molded with the fixing cover 130 with which the fixing entrance guide 131 (see FIG. 4) is integrally molded. Accordingly, as compared with a case where the fixing entrance guide 131 and the positioning projection 133 are formed of different components from each other, an increase in component tolerance can be eliminated and the positional accuracy between the fixing entrance guide 131 and the positioning projection 133 can be enhanced. Accordingly, contacting the positioning boss 121*a* of the transfer exit guide 121 to the positioning projection 133 to position can enhance the positional accuracy of the transfer exit guide 121 and the fixing entrance guide 131. Due to such a configuration, as illustrated in FIG. 9, the sheet guided by the transfer exit guide 121 and on which the toner image is transferred can be smoothly delivered to the fixing entrance guide 131 and can be smoothly entered to the nip portion N. As a result, a decrease in sheet conveyability can be prevented, and occurrence of wrinkles and a sheet jam can be prevented.

Opening the side cover 40*a* causes the transfer device 20 to move together with the side cover 40*a* and causes the positioning boss 121*a* to evacuate from the position facing the positioning projection 133. As a result, opening the side cover 40*a* illustrated in FIG. 2 allows the fixing device 32 to be removed from the opened side opening of the apparatus body 40.

Figure 10:
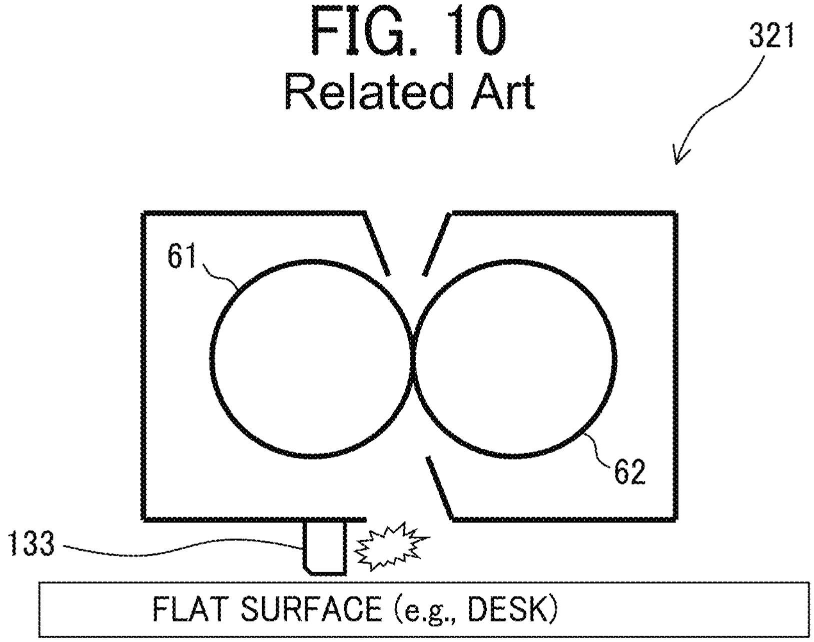
FIG. 10 Related Art
FIG. 10 is a diagram illustrating a problem of a fixing device according to a comparative example.

FIG. 10 is a diagram illustrating a problem of a fixing device according to a comparative example. As illustrated in FIG. 10, the positioning projection 133 projects most downward in a fixing device 321 according to a comparative example. Accordingly, when the fixing device 321 is removed from the apparatus body 40 and placed on a flat surface such as a desk, the positioning projection 133 contacts the flat surface. The fixing device 321 is reasonably heavy. The positioning projection 133 is disposed adjacent to the center in the left and right direction in FIG. 10 and near the center of gravity of the fixing device 321. As a result, when the fixing device 321 is placed on the flat surface, a large load is applied to the positioning projection 133.

As in the above-described embodiment, the positioning projection 133 is integrally molded with the fixing cover 130 made of resin in order to ensure desired positional accuracy of the fixing entrance guide 131 and the positioning projection 133. In order to prevent the positional accuracy from being lowered due to sink mark, the positioning projection 133 has a shape with the center notched (refer to FIGS. 12 and 17). Accordingly, the positioning projection 133 may not have sufficient rigidity to withstand a large load, and may be deformed. In a case where the fixing device 321 is roughly placed on a flat surface, the positioning projection 133 may be damaged in the worst case.

If the positioning projection 133 is deformed or broken, the position of the transfer exit guide 121 relative to the fixing device 321 is not determined accurately. As a result, the sheet guided by the transfer exit guide 121 and on which the toner image is transferred may not be smoothly delivered to the fixing entrance guide 131. Thus, the sheet conveyability may decrease. As a result, in the comparative example, sheet wrinkles and a sheet jam may occur.

Figure 11:
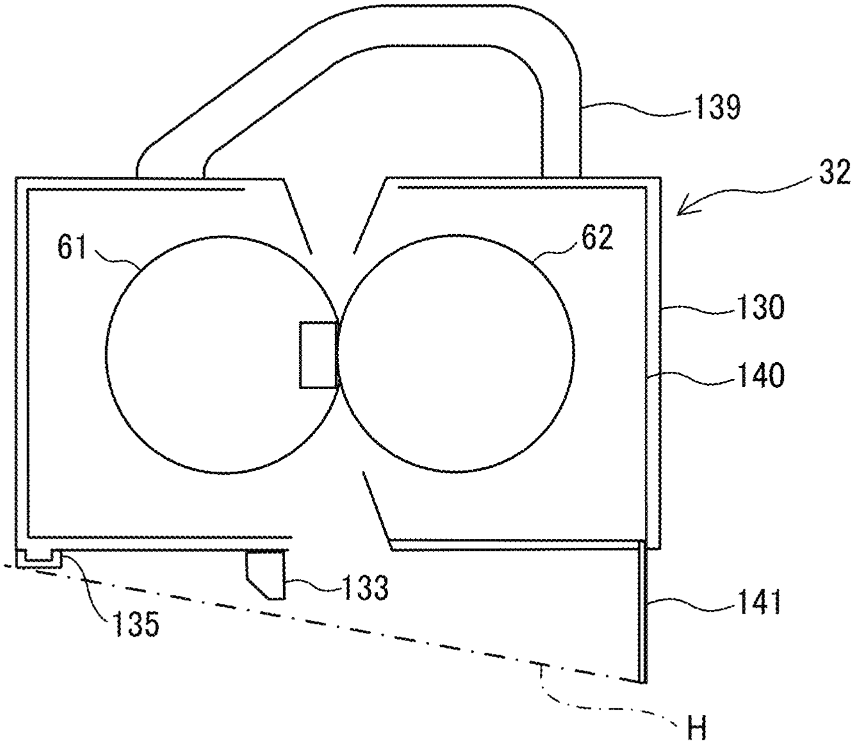
FIG. 11 is a diagram illustrating a characteristic portion of a fixing device according to an embodiment of the present disclosure.
Figure 12:
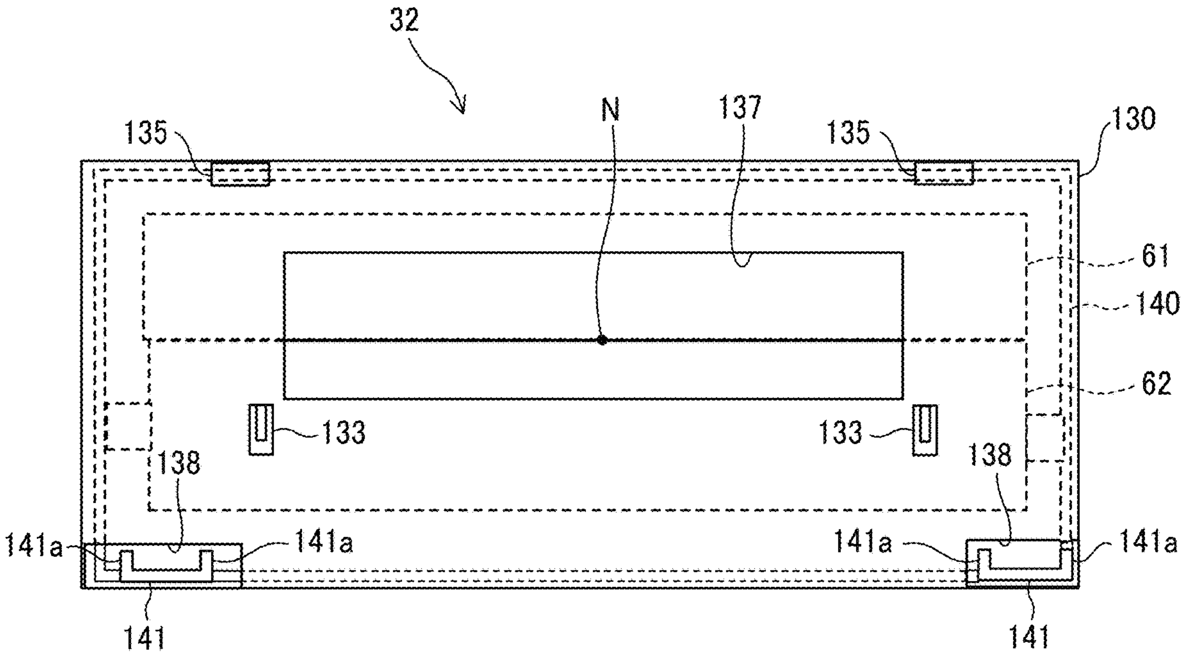
FIG. 12 is a schematic bottom view of a fixing device according to an embodiment of the present disclosure.

FIG. 11 is a diagram illustrating a characteristic portion of the fixing device 32 according to the present embodiment, and FIG. 12 is a schematic bottom view of the fixing device 32 according to the present embodiment. As illustrated in FIG. 11, the fixing device 32 of the present embodiment includes a first projection 141 as an upstream projection that projects downward from the positioning projection 133 at an upstream end (right end in FIG. 11) in an attachment direction in which the fixing device 32 is attached to the apparatus body. A second projection 135 that projects downward by a smaller amount than the positioning projection 133 is disposed at a downstream end (left end in FIG. 11) of the fixing device 32 in the attachment direction. The first projection 141 and the second projection 135 project downward such that a lower end of the positioning projection 133 is located above a line H connecting between a lower end of the first projection 141 and a lower portion of a downstream end of the second projection 135 in the attachment direction. A handle 139 is disposed on both sides in the sheet width direction of the upper face of the fixing device 32 that is the sheet ejection side (see also FIG. 18).

As illustrated in FIG. 12, each pair of the first projections 141, the second projections 135, and the positioning projections 133 are disposed at a specified interval in the sheet width direction. The first projections 141, the second projections 135, and the positioning projections 133 are disposed the outside a sheet entrance 137 of the fixing cover 130 in the sheet width direction.

The pair of first projections 141 are disposed outward from the positioning projections 133 in the sheet width direction. The first projections 141 are disposed at the metal frame 140 that holds, for example, the pressing roller 62 and the stay 65, and are arranged to project downward beyond a rectangular opening portion 138 disposed at a lower portion of the fixing cover 130. As illustrated in FIG. 12, ends of the first projection 141 in the sheet width direction are bent inward to increase rigidity of the first projection 141. The pair of second projections 135 is formed at the fixing cover 130 and has a top face with a rectangular shape that is long in the sheet width direction.

Figure 13:
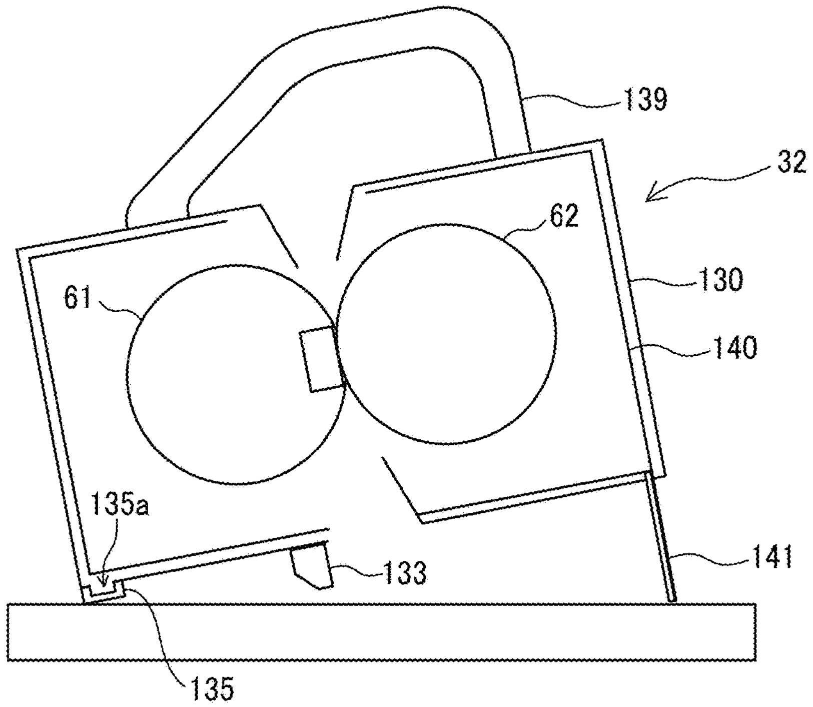
FIG. 13 is a schematic diagram of a fixing device, illustrating how the fixing device is placed on a flat surface such as a desk, according to an embodiment of the present disclosure.

FIG. 13 is a schematic diagram of the fixing device 32, illustrating how the fixing device 32 is placed on a flat surface such as a desk, according to the present embodiment. In the present embodiment, as described with reference to FIG. 11, the lower end of the positioning projection 133 is located higher than the line H connecting between the lower end of the first projection 141 and the lower portion of the downstream end of the second projection 135. As illustrated in FIG. 13, when the fixing device 32 detached from the apparatus body 40 is placed on a flat surface such as a desk, the first projection 141 and the second projection 135 can contact the flat surface and the positioning projection 133 can be in non-contact with the flat surface. Accordingly, deformation and breakage of the positioning projection 133 can be prevented, and the transfer exit guide 121 can be accurately positioned in the fixing device 32. As a result, the sheet guided by the transfer exit guide 121 and on which the toner image is transferred can be smoothly delivered to the fixing entrance guide 131. Thus, a decrease in sheet conveyability can be prevented. As a result, occurrence of sheet wrinkles and a sheet jam can be prevented.

When the fixing device 32 is placed on a flat surface such as a desk, the fixing device 32 is supported by the four points of the pair of first projections 141 and the pair of second projections 135 disposed near both ends of the fixing device 32 in the sheet width direction. Accordingly, the fixing device 32 can be stably placed on the flat surface. For example, one second projection 135 may be arranged in the center of the fixing device 32 in the sheet width direction so that the fixing device 32 is supported by the above-described flat surface at three points. In this case, it is preferable that making the length of the second projection 135 in the sheet width direction longer than the sheet entrance 137 can stably support the fixing device 32 by the above-described flat surface at three points.

When the fixing device 32 detached from the apparatus body 40 is placed on a flat surface such as a desk, the first projection 141 that projects lowest often contacts the flat surface first. When the fixing device 32 is roughly placed on the flat surface, impact may be applied to the first projection 141. Since the first projection 141 projects most downward, a bending moment that acts on the base of the first projection 141 due to the reaction force from above-described flat surface increases. Accordingly, a large force tends to be applied to the first projection 141. In the present embodiment, the first projection 141 is disposed at the metal frame 140 and is made of a metal material having an allowable bending stress greater than a resin material. With such a configuration, the first projection 141 is made of metal to preferably prevent the first projection 141 from being deformed or damaged. The first projection 141 is preferably made of an iron-based material such as SUS and is 0.8 mm or more, so that the first projection 141 has such a strength to be hardly deformed. The deformation of the first projection 141 when the fixing device 32 is roughly placed on a flat surface such as a desk can be prevented.

Figure 14A:
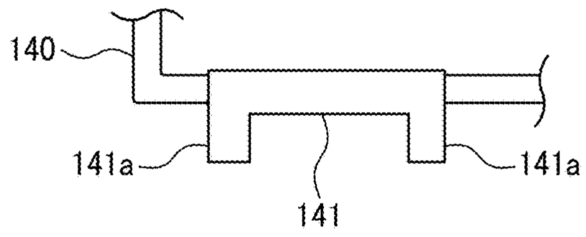
FIG. 14A is a diagram illustrating a configuration in which a bent portion of a first projection is bent outward by 90°, according to an embodiment of the present disclosure.
Figure 14B:
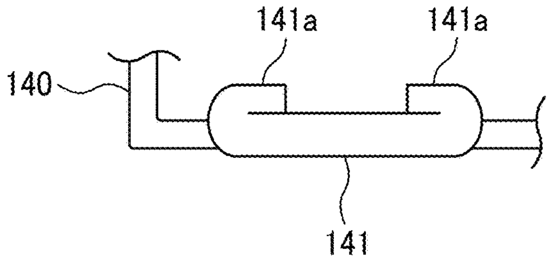
FIG. 14B is a diagram illustrating a configuration in which a bent portion of the first projection is bent inward by 180°, according to an embodiment of the present disclosure.

In the present embodiment, as illustrated in FIG. 12, the first projection 141 has bent portions 141*a* in which both sides in the sheet width direction of the first projection 141 are bent inward to strengthen the first projection 141. Thus, deformation of the first projection 141 can be preferably prevented. In the present embodiment, the bent portion 141*a* of the first projection 141 is bent inward (toward the sheet entrance 137) by 90°. As illustrated in FIG. 14A, both sides of the first projection 141 in the sheet width direction may be bent outward by 90°. As illustrated in FIG. 14B, both sides of the first projection 141 in the sheet width direction may be bent by substantially 180° to be pressed flat (hemming bending). Even with the bending as illustrated in FIGS. 14A and 14B, the strength of the first projection 141 can be increased. The hemming bending as illustrated in FIG. 14B can eliminate an edge and can enhance safety.

In the present embodiment, as illustrated in FIG. 11, the height of the second projection 135 disposed at the downstream end of the fixing device 32 in the attachment direction of the fixing device 32 to the apparatus body 40 is set to be lower than the positioning projection 133. As a result, the following advantages can be obtained.

Figure 15A:
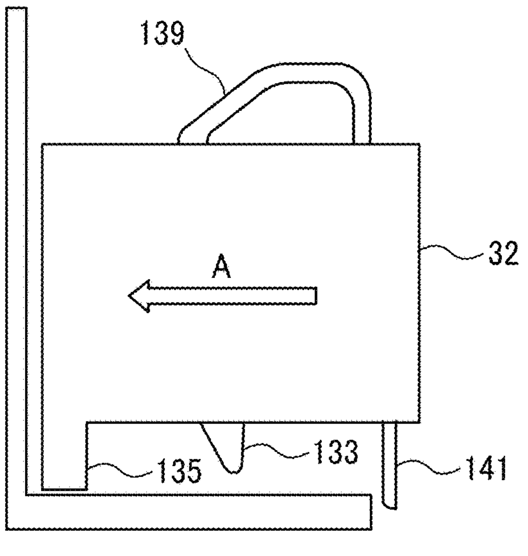
FIG. 15A is a diagram illustrating attachment of the fixing device to an apparatus body in a case where a second projection is higher than a positioning projection, according to an embodiment of the present disclosure.
Figure 15B:
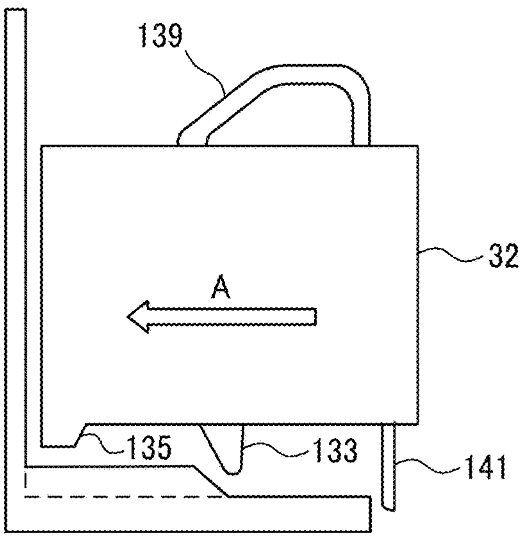
FIG. 15B is a diagram illustrating attachment of the fixing device according to an embodiment of the present disclosure to the apparatus body.

For example, in order to enable the fixing device 32 to move in the direction of arrow A in FIGS. 15A and 15B to be attachable to the apparatus body 40, a space for escaping the second projection 135 in the apparatus body 40 is provided. As can be seen from a comparison between FIGS. 15A and 15B, the height of the second projection 135 is set to be lower than the positioning projection 133, so that a space for escaping the second projection 135 in the apparatus body 40 can be narrower than in a case where the height of the second projection 135 in FIG. 15A is also higher than the positioning projection 133. As a result, for example, an exhaust duct for releasing heat of the fixing device 32 can be disposed in the narrowed space. Thus, the size of the image forming apparatus can be reduced.

The fixing device 32 can be attached to the apparatus body 40 without any particular space for escaping the second projection 135 in the apparatus body 40 with regard to the first projection 141 disposed at an upstream end in the attachment direction of the fixing device 32 (the direction indicated by arrow A in FIGS. 15A and 15B). Accordingly, even if the first projection 141 is higher than the positioning projection 133, increasing in size of the image forming apparatus can be prevented.

In the present embodiment, although the second projection 135 is disposed in the fixing device 32, the second projection 135 may not be provided. Eliminating the second projection 135 can obviate the need for providing a space for escaping the second projection 135 in the apparatus body 40. Thus, an advantageous effect can be obtained that the size of the image forming apparatus can be further reduced. On the other hand, in a case where the second projection 135 is eliminated, the downward projection amount of the first projection 141 is set to be larger than the downward projection amount in the configuration illustrated in FIG. 11, in order to position the lower end of the positioning projection 133 higher than the line H connecting the lower end of the first projection 141 illustrated in FIG. 11 and the lower portion of the downstream end of the fixing device in the attachment direction. As a result, a failure that the first projection 141 tends to be deformed may occur. Accordingly, in a case where sufficient strength of the first projection 141 cannot be achieved with only the first projection 141 due to an apparatus configuration, the second projection 135 is provided to prevent an increase in the size of the image forming apparatus to necessity minimum, while preventing deformation of the first projection 141. As the second projection 135 is arranged at the downstream end in the attachment direction of the fixing device 32, the heights of the first projection 141 and the second projection 135 can be reduced preferably.

Figure 16:
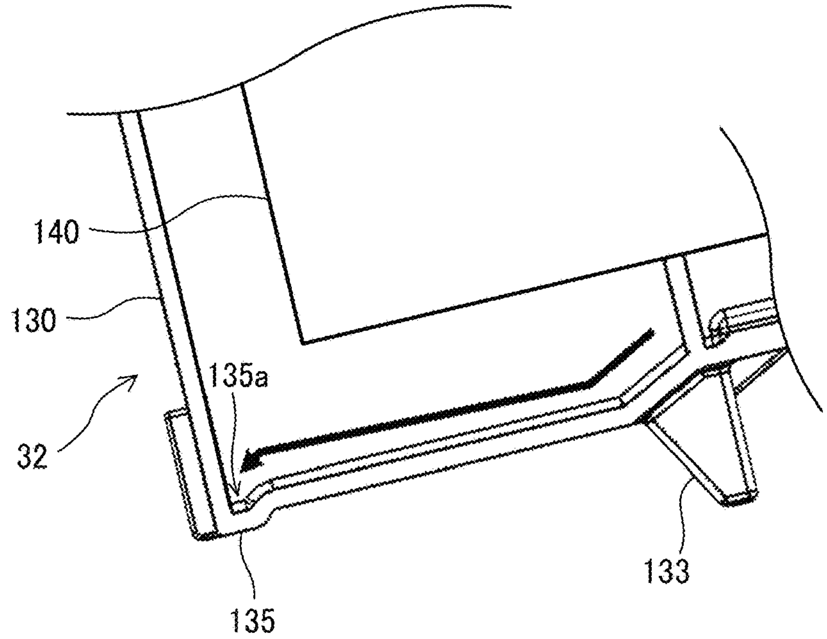
FIG. 16 is a diagram illustrating a flow of lubricant on a lower surface of an inner surface of a fixing cover when the fixing device is placed on a flat surface such as a desk, according to an embodiment of the present disclosure.

In the present embodiment, as illustrated in FIG. 13, a downstream end in the attachment direction of a lower inner surface of the fixing cover 130 is recessed to provide a lubricant storage 135*a* for storing the lubricant. As the fixing belt 61 rotates, the lubricant applied to the inner circumferential surface of the fixing belt 61 may drip from an edge of the fixing belt 61 due to, for example, being dammed by the nip-forming member 64. The dripped lubricant eventually drips onto the lower inner surface of the fixing cover 130 having a box shape. When the fixing device 32 is removed from the apparatus body 40 and placed on a flat surface such as a desk, the lubricant dropped on the lower surface of the fixing cover 130 flows downstream from the fixing device 32 in the attachment direction by its own weight as illustrated by an arrow in FIG. 16. The lubricant that has flowed toward the downstream side in the attachment direction flows down to the lubricant storage 135*a* having a recessed shape, and can be accumulated in the lubricant storage 135*a*. As a result, when the fixing device placed on a desk is carried, leakage of the lubricant from the sheet entrance 137 can be prevented.

In the present embodiment, the recessed portion, which is formed such that the second projection 135 has substantially the same thickness as the other portions to avoid occurrence of sink marks, is used as a lubricant storage. As a result, the fixing cover 130 can be designed compactly without providing unnecessary shapes.

Figure 17:
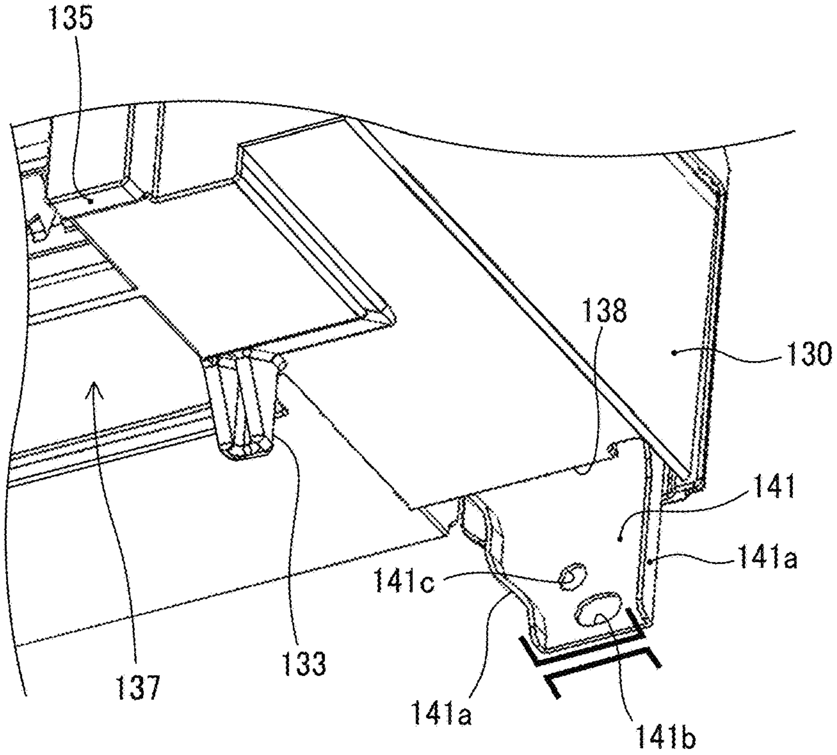
FIG. 17 is an enlarged perspective view of a first projection and elements or areas around the first projection, according to an embodiment of the present disclosure.

FIG. 17 is an enlarged perspective view of the first projection 141 and elements or areas around the first projection 141, according to the present embodiment. In the present embodiment, the first projection 141 has a positioning hole 141*b* serving as a positioning portion for positioning the fixing device 32 to the apparatus body 40 and a fastening hole 141*c* serving as a fastening portion through which a screw 146 for fastening the fixing device 32 to the apparatus body 40 penetrates.

With such a configuration, the positioning hole 141*b* serving as the positioning portion and the fastening hole 141*c* serving as the fixing portion are disposed in the first projection 141, so that the following advantages are obtained compared to a case where a positioning portion or a fixing portion that positions the fixing device 32 in the apparatus body 40 is provided separately from the first projection 141. For example, an advantageous effect in which an unnecessary shape can be eliminated and the fixing device 32 can be reduced in size to be compact.

Figure 18:
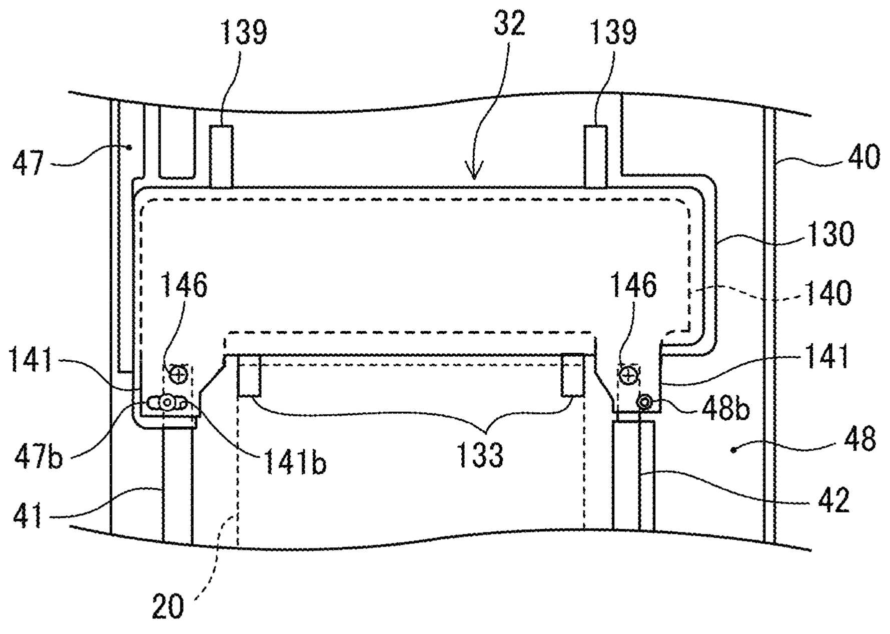
FIG. 18 is a schematic diagram of a fixing device mounted in an apparatus body as viewed from an upstream side in an attachment direction of the fixing device, according to an embodiment of the present disclosure.
Figure 19A:
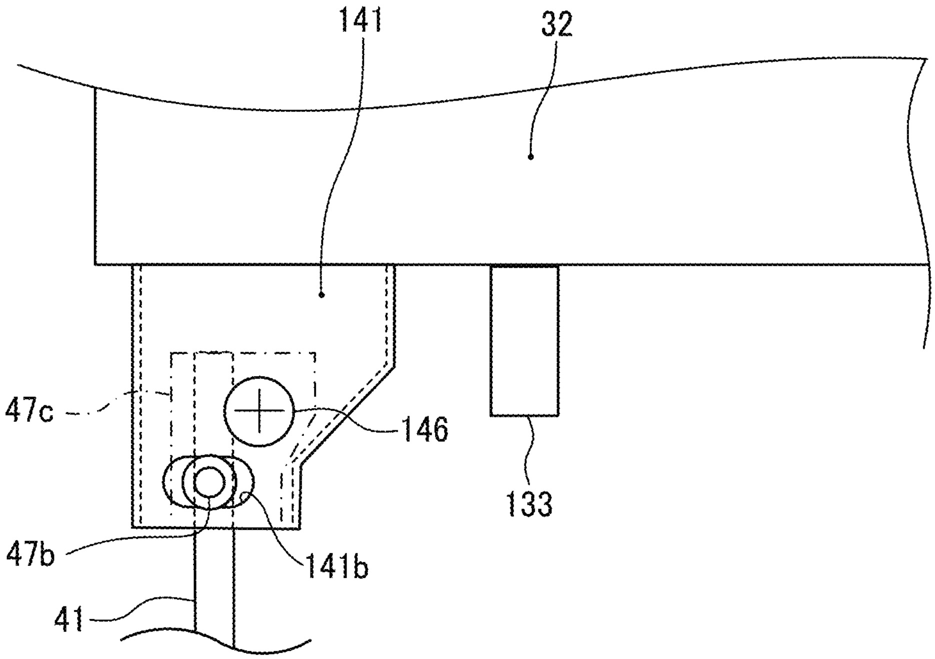
FIG. 19A is a schematic diagram of positioning and fixing of a first projection on a front side of an apparatus body, according to an embodiment of the present disclosure.
Figure 19B:
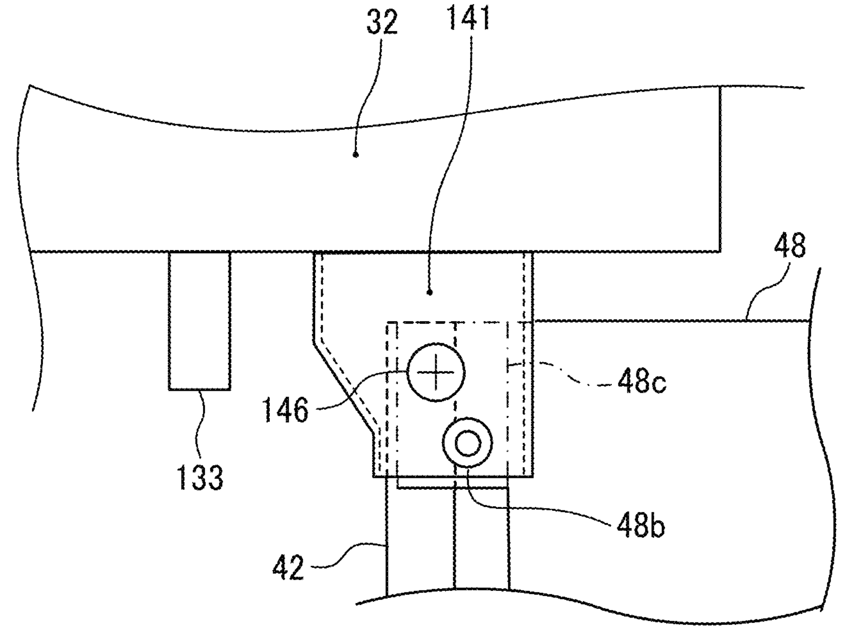
FIG. 19B is a schematic diagram of positioning and fixing of a first projection on a rear side of the apparatus body, according to an embodiment of the present disclosure.
Figure 20A:
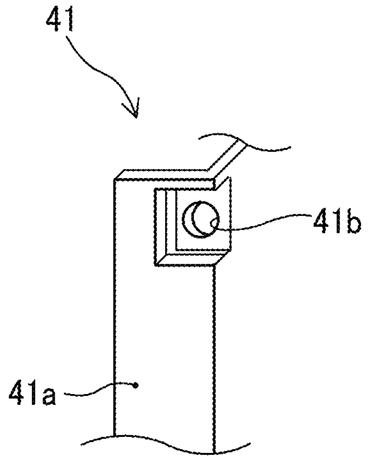
FIGS. 20A, 20B, 20C, and 20D are perspective views of a portion of an apparatus body for positioning and fixing a fixing device, and illustrate the structures thereof, according to an embodiment of the present disclosure.
Figure 20B:
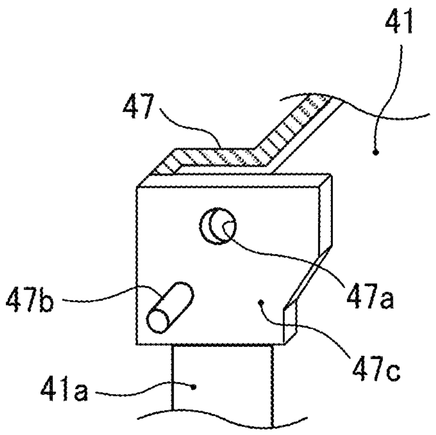
Figure 20C:
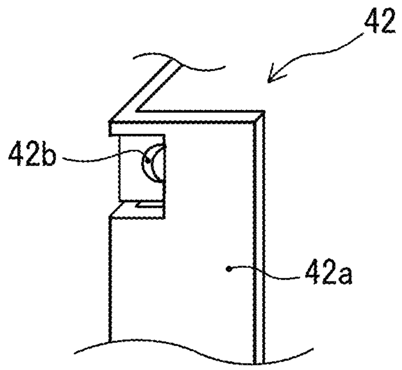
Figure 20D:
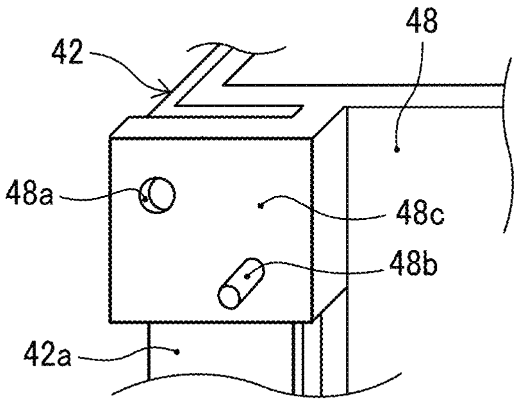

FIG. 18 is a schematic diagram of the fixing device 32 attached to the apparatus body 40 as viewed from the upstream side in the attachment direction of the fixing device 32, according to the present embodiment. FIG. 19A is a schematic diagram of positioning and fixing of the first projection 141 on the front side of the apparatus body. FIG. 19B is a schematic diagram of positioning and fixing of the first projection 141 on the rear side of the apparatus body. FIGS. 20A, 20B, 20C, and 20D are perspective views of a portion in which the fixing device 32 of the apparatus body 40 is positioned and fixed, and illustrate the structures thereof, according to the present embodiment. FIGS. 20A and 20B are diagrams each illustrating a structure on the front side of the apparatus body, according to the present embodiment. FIGS. 20C and 20D are diagrams illustrating a structure on the rear side of the apparatus body, according to the present embodiment.

As illustrated in FIGS. 19A and 20A, the front side plate 41 made of a metal plate of a main body frame that is the structure of the apparatus body 40 has a screw hole 41*b* for fastening the front first projection 141 with the screw 146. As illustrated in FIG. 20B, a resin front cover 47 of the apparatus body 40 disposed between an exterior cover and the front side plate 41 has a front positioning counter surface 47*c* that extends around a bent portion 41*a* of the front side plate 41 and faces the first projection 141 on the front side. An intermediate fastening hole 47*a* through which the screw 146 penetrates and a positioning projection 47*b* are disposed in the front positioning counter surface 47*c*.

As illustrated in FIGS. 19B and 20C, a rear side plate 42 of the main body frame has a screw hole 42*b* to which the rear first projection 141 is fastened with the screw 146. As illustrated in FIG. 20D, a resin rear cover 48 disposed between the rear side plate 42 and the exterior cover has a rear positioning counter surface 48*c* that extends around the bent portion 42*a* of the rear side plate 42 and faces the first projection 141 on the rear side. The rear positioning counter surface 48*c* has an intermediate fastening hole 48*a* through which the screw 146 penetrates and a positioning projection 48*b*.

As illustrated in FIG. 19A, the positioning hole 141*b* of the first projection 141 on the front side of the apparatus is a sub-reference for positioning, and has an elongated hole shape elongated in the sheet width direction. On the other hand, as illustrated in FIG. 19B, the positioning hole 141*b* of the first projection 141 on the rear side of the apparatus is a main reference for positioning, and has a circular hole whose inner diameter is slightly larger than the outer diameter of the positioning projection 48*b*.

The positioning projections 47*b* and 48*b* of the resin front cover 47 and the resin rear cover 48 penetrate through the positioning hole 141*b* of the first projection 141 to position the fixing device 32 to the apparatus body 40. The screws 146 are passed through the fastening hole 141*c* of each one of the pair of first projections 141 and the intermediate fastening holes 47*a* and 48*a* of the positioning counter surfaces 47*c* and 48*c*, and are screwed into the screw holes of the side plates 41 and 42. As a result, the fixing device 32 is fastened to the apparatus body 40.

In the present embodiment, positioning projections are arranged on the resin cover, and screw holes with screw grooves in their inner surface for fastening the fixing device 32 are arranged in the side plates 41 and 42 made of sheet metal of the main body frame made of sheet metal. With such a configuration, the fixing device 32 is fastened to the front side plate and the rear side plate of the main body frame that is the main body structure, so that the fixing device 32 contributes to increasing the strength of the main body frame and increases the rigidity of the image forming apparatus. The resin covers 47 and 48 are provided with positioning projections for positioning the fixing device 32 to the apparatus body 40 to form the positioning projections by integral molding. As a result, manufacture can be performed with low cost as compared with the case of forming the positioning projections on the side plates 41 and 42 made of sheet metal.

As described with reference to FIG. 5, even when a sheet having the maximum sheet conveyance width is conveyed, the lengths of the fixing belt 61 and the pressing roller 62 are longer than the length between the two ends of the maximum sheet conveyance width so that the fixing belt 61 can be preferably driven to rotate. As a result, as illustrated in FIG. 18, the fixing device 32 tends to be larger in the front and rear direction of the apparatus than the transfer device 20 or the process cartridge 1 indicated by broken lines in FIG. 18.

Accordingly, the size of the fixing device 32 in the front and rear direction tends to be a bottleneck in reducing the size of the image forming apparatus in the front and rear direction. In the present embodiment, the first projection 141 is disposed not to protrude from the fixing device 32 in the front and rear direction (in the sheet width direction). As a result, an increase in the size of the fixing device 32 in the front and rear direction can be prevented, which can contribute to reduction in the size of the image forming apparatus in the front and rear direction.

Figure 21:
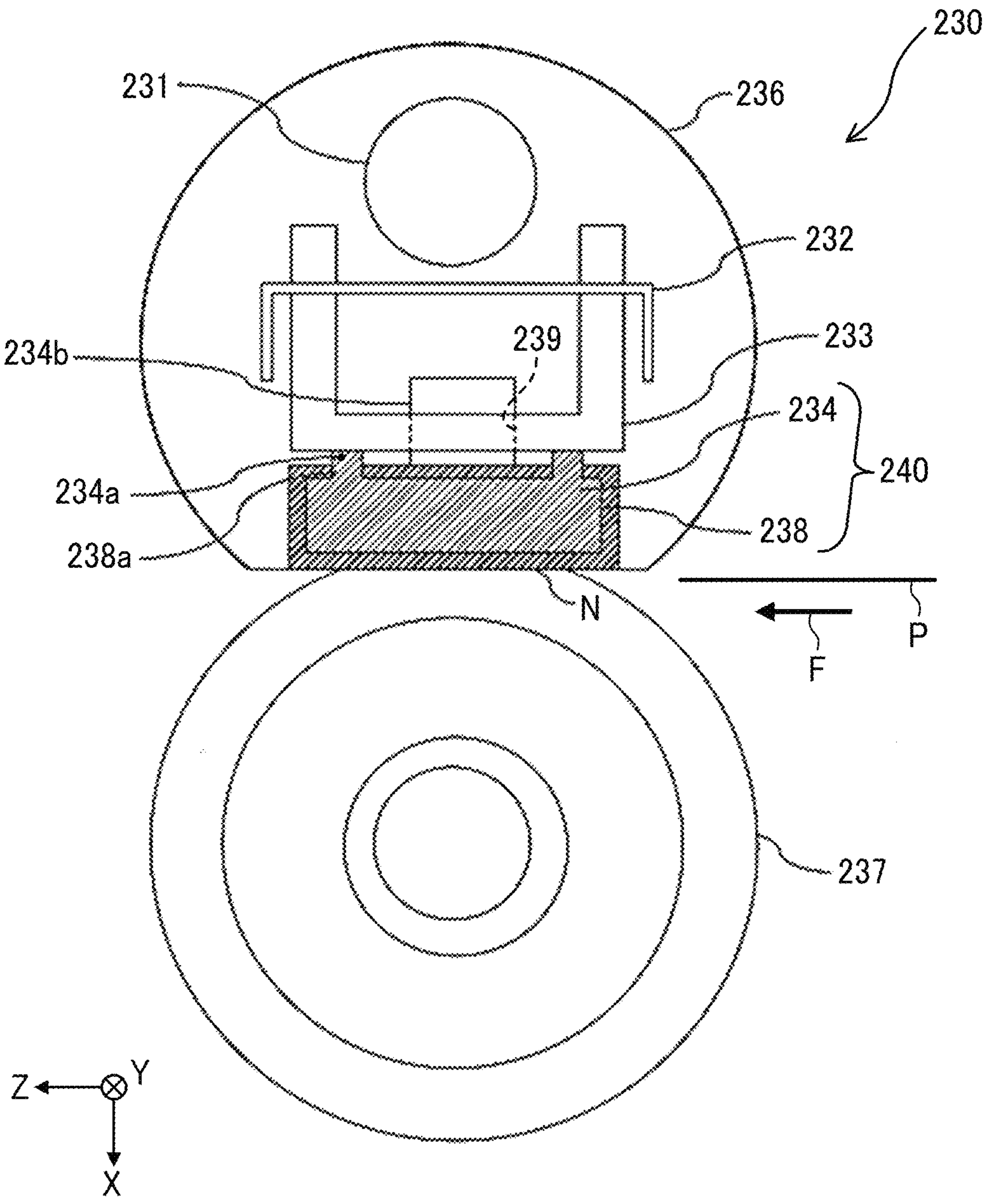
FIG. 21 is a cross-sectional view of a fixing device according to a modification of an embodiment of the present disclosure.
Figure 22:
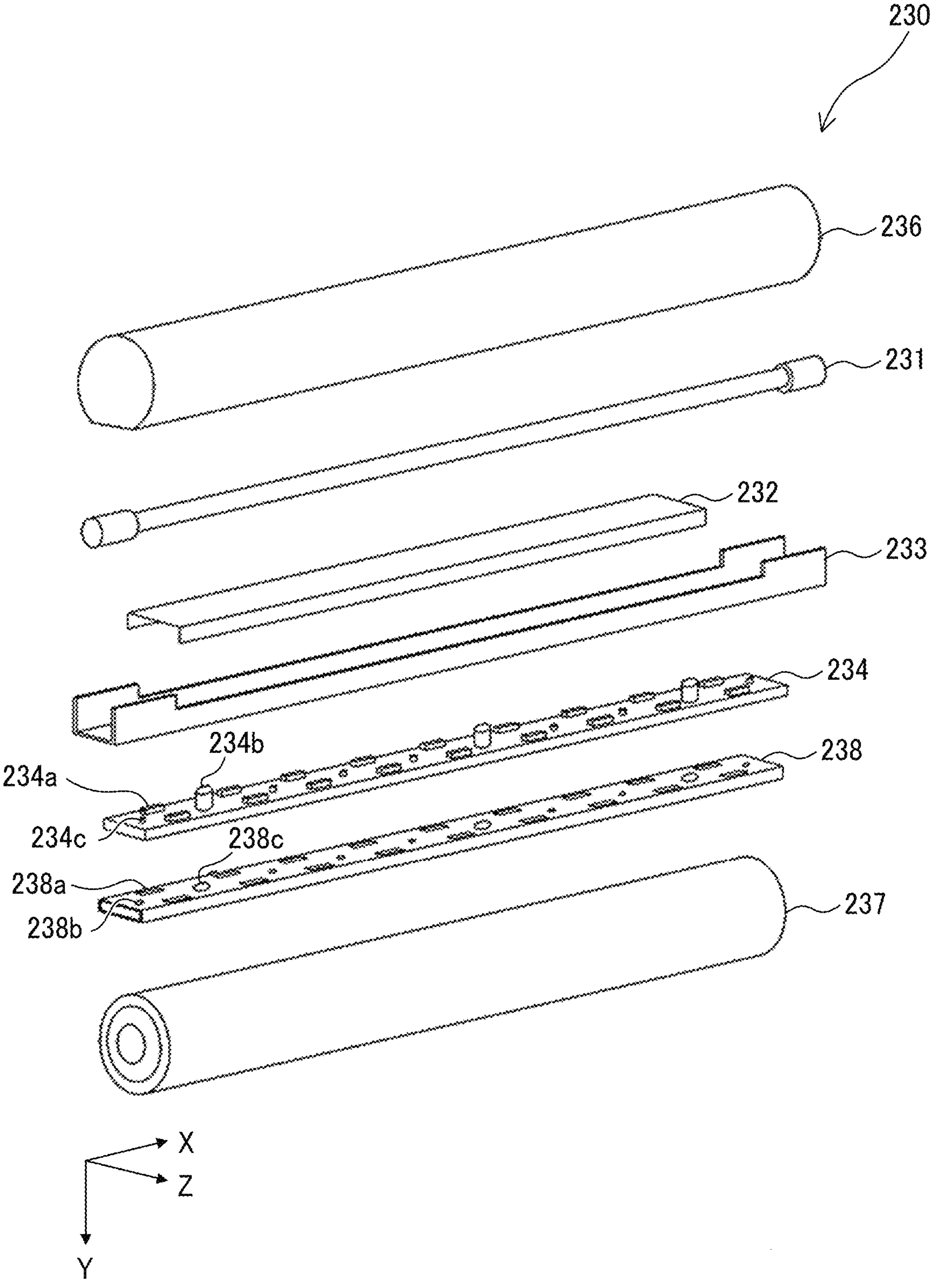
FIG. 22 is an exploded perspective view of the fixing device according to a modification of an embodiment of the present disclosure.

A description is given below of the fixing device according to a modification. FIG. 21 is a cross-sectional view of a fixing device 230 according to the modification. FIG. 22 is an exploded perspective view of the fixing device 230 according to the modification. The fixing device 230 according to the modification includes, for example, a heater 231, a reflector 232, a stay 233, a fixing belt 236, a pressing roller 237, and a nip-forming member 240. The nip-forming member 240 includes, for example, a metal supporter 234 and a heat equalizing pad 238.

The fixing belt 236 is an endless belt having a specified inner diameter and a width greater than the width of the sheet P. The fixing belt 236 is formed of a flexible material, and includes, for example, a base material layer, an elastic layer disposed on an outer circumferential surface of the base material layer, and a release layer disposed on an outer circumferential surface of the elastic layer.

The base material layer is formed of metal such as SUS and Ni, the elastic layer is formed of silicone rubber, and the release layer is formed of PFA tube. Both ends of the fixing belt 236 are supported to be rotatable by a fixing housing.

The stay 233 is disposed at a lower portion of the hollow portion of the fixing belt 236. The stay 233 is longer than the length of the fixing belt 236 in the width direction X, a channel-shaped (U-shaped in cross section) member whose upper face is open, and both ends of the stay 233 are supported by the fixing housing. The stay 233 has three positioning holes 239 with specified intervals in the width direction X. Positioning pins **234*b* of the metal supporter 234 of the nip-forming member 240 are fit in the positioning holes 239, so that the nip-forming member 240 is positioned to the stay 233. The reflector 232 is supported at the upper surface of the stay 233**.

The heater 231 (e.g., a halogen heater) has a length equivalent to the length of the fixing belt 236 in the rotation axis direction. The heater 231 is disposed in an upper portion (above the stay 233) of the hollow portion of the fixing belt 236. Both ends of the heater 231 are supported by the fixing housing.

The heater 231 radiates radiant heat toward an inner circumferential surface of the fixing belt 236 (typically, a portion that is slightly narrower than an upper half of the circumference of the fixing belt 236) and heats the fixing belt 236. The radiant heat radiated downward from the heater 231 is reflected toward an inner circumferential surface of the fixing belt 236 by the reflector 232. The heater 231 is controlled by a controller.

The pressing roller 237 includes a core metal, an elastic layer disposed on an outer circumferential surface of the core metal, and a release layer disposed on an outer circumferential surface of the elastic layer. The elastic layer is made of, for example, silicone rubber. The release layer is formed of, for example, PFA tube.

The pressing roller 237 is disposed facing the fixing belt 236 and is supported by the fixing housing. The pressing roller 237 contacts an outer circumferential surface of the fixing belt 236 to form a nip portion N between the pressing roller 237 and the fixing belt 236. The pressing roller 237 is coupled to a motor controlled by, for example, a controller and is driven to rotate. As the pressing roller 237 rotates counterclockwise in FIG. 21, the fixing belt 236 is driven by the pressing roller 237 to rotate clockwise, which is opposite to the rotation direction of the pressing roller 237. As a result, the sheet P passes through the nip portion N.

The metal supporter 234 of the nip-forming member 240 is a flat substantially rectangular parallelepiped member elongated in the width direction X of the fixing belt 236, and is made of, for example, a metallic material. On a surface of the metal supporter 234 facing the stay 233, a plurality (e.g., eighteen) of projections **234*a*, a plurality (e.g., seven) of fixing pins 234*c*, and a plurality (e.g., three) of positioning pins 234*b*** are arranged at specified positions in a standing manner.

The heat equalizing pad 238 is a sheet-shaped member that is as wide as the metal supporter 234 and has a length enough to be wound around the metal supporter 234. For example, the heat equalizing pad 238 is formed by braiding PTFE fibers and polyphenylenesulfide (PPS) fibers.

The heat equalizing pad 238 is wound around the metal supporter 234 one round such that both ends are positioned in the center of a surface of the metal supporter 234 facing the stay 233 in the sheet conveyance direction. Through holes **238*a* through which projections 234*a* of the metal supporter 234 penetrate are arranged at positions around which the heat equalizing pad 238 is wound on the surface facing the stay 233. The heat equalizing pad 238 is provided with fixing holes 238*b* in which the fixing pins 234*c* formed by combining both ends are fitted and positioning holes 238*c* in which the positioning pins 234*b*** are fitted.

The heat equalizing pad 238 may be impregnated with lubricant (oil or grease), and the lubricant may be applied to the inner circumferential surface of the fixing belt 236 by the heat equalizing pad 238.

The fixing device 32 according to the modification having such a configuration can fix the toner image on the sheet P by the same operation as the fixing device 32 according to the present embodiment illustrated in FIG. 4.

A description is given of an example in which the present disclosure is applied to the fixing device as a removable unit in the present embodiment. The present disclosure is not limited to the fixing device, and is applicable to a unit attachable to and detachable from a body of the image forming apparatus. For example, in a case where a positioning portion for positioning a process cartridge as a removable unit in the apparatus body 40 has a shape projecting downward, deformation of the positioning portion can be prevented when the process cartridge is removed from the apparatus by applying the present disclosure.

The above-described embodiments are given as examples, and, for example, the following aspects of the present disclosure may have advantageous effects described below.

First Aspect

In the first aspect, a removable unit (e.g., the fixing device 32) that is attachable to and detachable from an apparatus body (e.g., the apparatus body 40) of an apparatus includes a positioning projection (e.g., the positioning projection 133) that projects downward and positions a unit or a member located below the removable unit in a state of being attached to the apparatus body and an upstream projection (e.g., the first projection 141) that projects more downward than the positioning projection at an upstream end of the removable unit in an attachment direction of the removable unit to the apparatus. A lower end of the positioning projection is located higher than a line (e.g., the line H) connecting a lower end of the upstream projection and a lower portion of a downstream end of the removable unit in the attachment direction when viewed in a direction orthogonal to both an up and down direction and the attachment direction (e.g., the sheet width direction in the above-described embodiment). According to this configuration, as described in the present embodiment, when the removable unit removed from the apparatus body is placed on a flat surface such as a desk, the positioning projection can be in non-contact with the flat surface, and damage of the positioning projection can be prevented.

Second Aspect

In the second aspect, in the removable unit (e.g., the fixing device 32) according to the first aspect, the upstream projection (e.g., the first projection 141) is disposed at the upstream end in the attachment direction. According to this configuration, as described in the present embodiment, the removable unit can be attached to the apparatus body without providing the apparatus body with an escape space to which the upstream projection is escaped. As a result, an increase in size of the apparatus body is prevented.

Third Aspect

In the third aspect, in the removable unit (e.g., the fixing device 32) according to the first or second aspect, no projection that projects more downward than the positioning projection (e.g., the positioning projection 133) is on a downstream side from the positioning projection in the attachment direction. According to this configuration, as described with reference to FIG. 15, a space downstream from the positioning projection of the apparatus body (e.g., the apparatus body 40) in the attachment direction can be effectively used, and thus the size of the apparatus body to which the removable unit is attached and from which the removable unit is detached can be reduced.

Fourth Aspect

In the fourth aspect, in the removable unit (e.g., the fixing device 32) according to any one of the first to third aspects, the positioning projection (e.g., the positioning projection 133) positions a guide (e.g., the transfer exit guide 121) that guides a sheet (e.g., the sheet P) conveyed to the removable unit (e.g., the fixing device 32). According to this configuration, as described in the present embodiment, a sheet can be favorably guided to the removable unit such as the fixing device, and a decrease of the sheet conveyability to the removable unit can be prevented. As a result, the occurrence of sheet wrinkles and a sheet jam can be prevented.

Fifth Aspect

In the fifth aspect, in the removable unit (e.g., the fixing device 32) according to any one of the first to fourth aspects, the upstream projection (e.g., the first projection 141) includes at least one of a positioning portion (e.g., the positioning hole 141*b*) to position the removable unit in the apparatus body (e.g., the apparatus body 40) or a fixing portion (e.g., the fastening hole 141*c*) to fix the removable unit in the apparatus body. According to this configuration, as described with reference to FIG. 16, unnecessary shapes can be eliminated as compared with a case where a positioning portion that positions the removable unit to the apparatus body or a fixing portion that fixes the removable unit to the apparatus body is disposed separately from the upstream projection such as the first projection. As a result, the removable unit can be reduced in size.

Sixth Aspect

In the sixth aspect, in the removable unit (e.g., the fixing device 32) according to any one of the first to fifth aspects, the upstream projection (e.g., the first projection 141) is made of a material (a metal plate in the present embodiment) having an allowable bending stress greater than the positioning projection (e.g., the positioning projection 133). According to this configuration, as described in the present embodiment, the deformation of the first projection can be prevented when the removable unit is placed on a flat surface such as a desk as compared with a case where the first projection and the positioning projection are made of the same material.

Seventh Aspect

In the seventh aspect, in the removable unit (e.g., the fixing device 32) according to any one of the first to sixth aspects, the upstream projection (e.g., the first projection 141) is made of a metal plate and has a bent shape. According to this configuration, as described in the present embodiment, the rigidity of the first projection can be increased, and the deformation of the first projection can be prevented when the removable unit is placed on a flat surface such as a desk.

Eighth Aspect

In the eighth aspect, in the removable unit (e.g., the fixing device 32) according to any one of the first to seventh aspects, the upstream projection (e.g., the first projection 141) is disposed not to protrude beyond an end of the removable unit in the direction orthogonal to both the up and down direction and the attachment direction (the sheet width direction in the present embodiment). According to this configuration, as described in the present embodiment, an increase in the size of the removable unit in the direction orthogonal to both the up and down direction and the attachment direction can be prevented, and an increase in the size of the apparatus body (e.g., the apparatus body 40) in the orthogonal direction can be prevented.

Ninth Aspect

In the ninth aspect, the removable unit (e.g., the fixing device 32) according to any one of the first to eighth aspects is fastened to a structure such as a body frame made of a metal plate of the apparatus body (e.g., the apparatus body 40). According to this configuration, as described in the present embodiment, the apparatus body can be reinforced by the removable unit.

Tenth Aspect

In the tenth aspect, the removable unit (e.g., the fixing device 32) according to any one of the first to ninth aspects is supported at three or more points by the upstream projection (e.g., the first projection 141) and the downstream end of the removable unit in the attachment direction when the removable unit detached from the apparatus body (e.g., the apparatus body 40) is placed on a flat surface. According to this configuration, as described in the present embodiment, the removable unit detached from the apparatus body can be stably placed on a flat surface.

Eleventh Aspect

In the eleventh aspect, the removable unit (e.g., the fixing device 32) according to any one of the first to tenth aspects further includes a heating member (e.g., the fixing belt 61) that heats the sheet, and a pressing member (e.g., the pressing roller 62) that forms a nip portion in contact with an outer circumferential surface of the heating member and presses the sheet passing through forms a nip portion. The removable unit fixes the image on the sheet onto the sheet.

Twelfth Aspect

In the twelfth aspect, in the removable unit (e.g., the fixing device 32) according to the eleventh aspect, the heating member (e.g., the fixing belt 61) is an endless belt and includes a pad (e.g., the nip-forming member 64) that nips the heating member between the pad and the pressing member (e.g., the pressing roller 62) in the nip portion. The heating member rotates by a drive force transmitted from the pressing member in the nip portion. The upstream projection (e.g., the first projection 141) is disposed not to protrude beyond an end of the revvable unit in the direction orthogonal to both the up and down direction and the attachment direction. According to this configuration, as described with reference to FIG. 5, the heating member may be longer by 15 to 20 mm from the end of the maximum conveyable width of the apparatus body (e.g., the apparatus body 40) so that the heating member is driven to rotate by the pressing roller in a case where the heating member rotates by a drive force transmitted from the pressing member such as the pressing roller at a nip portion. Accordingly, the removable unit may be larger in a direction orthogonal to both the up and down direction and the attachment direction. As a result, in the configuration described above, the upstream projection is disposed not to protrude beyond the end of the removable unit in the direction orthogonal to both the up and down direction and the attachment direction, and thus an increase in the size of the apparatus body in the orthogonal direction is prevented effectively.

Thirteenth Aspect

In the thirteenth aspect, in the removable unit (e.g., the fixing device 32) according to the eleventh aspect, the heating member (e.g., the fixing belt 61) is an endless belt and includes a pad (e.g., the nip-forming member 64) that nips the heating member between the pad and the pressing member (e.g., the pressing roller 62) in the nip portion. The heating member rotates by a drive force transmitted from the pressing member in the nip portion. A lubricant is applied on an inner circumferential surface of the heating member. The removable unit includes a lubricant storage (e.g., the lubricant storage 135*a*) in which a lubricant is stored at the downstream end of the removable unit in the attachment direction. According to this configuration, as described in the present embodiment, when the removable unit detached from the apparatus body (e.g., the apparatus body 40) is placed on a flat surface such as a desk, lubricant dripped from the heating member can be stored in the lubricant storage. As a result, when the fixing device is carried thereafter, leaking of lubricant from the fixing device can be prevented.

Fourteenth Aspect

In the fourteenth aspect, an image forming apparatus (e.g., the image forming apparatus 100) includes a removable unit, which is the removable unit (e.g., the fixing device 32) according to any one of the first to thirteenth aspects. According to this configuration, the occurrence of sheet wrinkles and a sheet jam can be prevented.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A removable unit that is attachable to and detachable from a body of an apparatus, the removable unit comprising:

a positioning projection projecting downward to position a unit or a member located below the removable unit when the removable unit is attached to the body; and an upstream projection projecting more downward than the positioning projection at an upstream end of the removable unit in an attachment direction of the removable unit to the apparatus, wherein a lower end of the positioning projection is located higher than a line connecting a lower end of the upstream projection and a lower portion of a downstream end of the removable unit in the attachment direction when viewed in a direction orthogonal to both an up and down direction and the attachment direction, and wherein the upstream projection comprises a material having an allowable bending stress greater than the positioning projection.

2. The removable unit according to claim 1, wherein the upstream projection is disposed at the upstream end in the attachment direction.

3. The removable unit according to claim 1, wherein no projection projecting more downward than the positioning projection is on a downstream side from the positioning projection in the attachment direction.

4. The removable unit according to claim 1, wherein the positioning projection is to position a guide that guides a sheet conveyed to the removable unit.

5. The removable unit according to claim 1, wherein the upstream projection includes at least one of a positioning portion to position the removable unit in the body or a fixing portion to fix the removable unit in the body.

6. The removable unit according to claim 1, wherein the upstream projection does not protrude beyond an end of the removable unit in the direction orthogonal to both the up and down direction and the attachment direction.

7. The removable unit according to claim 1, wherein the removable unit is fastened to a structure comprising a metal plate of the body.

8. The removable unit according to claim 1, further comprising:

a heater to heat a sheet; and a presser to form a nip portion in contact with an outer circumferential surface of the heater and press the sheet passing through the nip portion, wherein the heater and the presser are to fix an image on the sheet.

9. The removable unit according to claim 8, wherein the heater includes an endless belt and a pad that nips the heater between the pad and the presser in the nip portion, wherein the heater is to rotate by a drive force transmitted from the presser in the nip portion, and wherein the upstream projection is disposed not to protrude beyond an end of the removable unit in the direction orthogonal to both the up and down direction and the attachment direction.

10. An image forming apparatus, comprising the removable unit according to claim 1.

11. The removable unit according to claim 8, wherein:

the heater includes an endless belt and a pad that nips the heater between the pad and the presser in the nip portion, the heater is to rotate by a drive force transmitted from the presser in the nip portion, and the upstream projection is disposed not to protrude beyond an end of the removable unit in the direction orthogonal to both the up and down direction and the attachment direction.

12. A removable unit that is attachable to and detachable from a body of an apparatus, the removable unit comprising:

a positioning projection projecting downward to position a unit or a member located below the removable unit when the removable unit is attached to the body; and an upstream projection projecting more downward than the positioning projection at an upstream end of the removable unit in an attachment direction of the removable unit to the apparatus, wherein a lower end of the positioning projection is located higher than a line connecting a lower end of the upstream projection and a lower portion of a downstream end of the removable unit in the attachment direction when viewed in a direction orthogonal to both an up and down direction and the attachment direction, and wherein the upstream projection comprises a metal plate and has a bent shape.

13. An image forming apparatus, comprising the removable unit according to claim 12.

14. A removable unit that is attachable to and detachable from a body of an apparatus, the removable unit comprising:

a positioning projection projecting downward to position a unit or a member located below the removable unit when the removable unit is attached to the body; and an upstream projection projecting more downward than the positioning projection at an upstream end of the removable unit in an attachment direction of the removable unit to the apparatus, wherein a lower end of the positioning projection is located higher than a line connecting a lower end of the upstream projection and a lower portion of a downstream end of the removable unit in the attachment direction when viewed in a direction orthogonal to both an up and down direction and the attachment direction, and wherein the removable unit is supported at three or more points by the upstream projection and the downstream end of the removable unit in the attachment direction when the removable unit detached from the body is placed on a flat surface.

15. The removable unit according to claim 14, further comprising:

a heater to heat a sheet; and a presser to form a nip portion in contact with an outer circumferential surface of the heater and press the sheet passing through the nip portion, wherein the heater and the presser are to fix an image on the sheet, wherein the heater includes an endless belt and a pad that nips the heater between the pad and the presser in the nip portion, wherein the heater is to rotate by a drive force transmitted from the presser in the nip portion, and wherein the upstream projection is disposed not to protrude beyond an end of the removable unit in the direction orthogonal to both the up and down direction and the attachment direction.

16. An image forming apparatus, comprising the removable unit according to claim 14.

17. A removable unit that is attachable to and detachable from a body of an apparatus, the removable unit comprising:

a positioning projection projecting downward to position a unit or a member located below the removable unit when the removable unit is attached to the body;

an upstream projection projecting more downward than the positioning projection at an upstream end of the removable unit in an attachment direction of the removable unit to the apparatus;

a heater to heat a sheet; and a presser to form a nip portion in contact with an outer circumferential surface of the heater and press the sheet passing through the nip portion, wherein the heater and the presser are to fix an image on the sheet, wherein a lower end of the positioning projection is located higher than a line connecting a lower end of the upstream projection and a lower portion of a downstream end of the removable unit in the attachment direction when viewed in a direction orthogonal to both an up and down direction and the attachment direction, and wherein the heater includes an endless belt and a pad that nips the heater between the pad and the presser in the nip portion, wherein the heater is to rotate by a drive force transmitted from the presser in the nip portion, wherein a lubricant is applied on an inner circumferential surface of the endless belt, and wherein the removable unit includes a lubricant storage in which the lubricant is stored at the downstream end of the removable unit in the attachment direction.

18. The removable unit according to claim 17, wherein:

the upstream projection is disposed not to protrude beyond an end of the removable unit in the direction orthogonal to both the up and down direction and the attachment direction.

19. An image forming apparatus, comprising the removable unit according to claim 17.

* * * * *